(12) United States Patent
Patel et al.

(10) Patent No.: US 12,488,425 B2
(45) Date of Patent: Dec. 2, 2025

(54) LOW-LIGHT IMAGE ENHANCEMENT USING KEY FRAME AND DEPENDENT FRAME NEURAL NETWORKS

(71) Applicant: QUALCOMM Incorporated, San Diego, CA (US)

(72) Inventors: Shubham Deepak Patel, Gondia (IN); Pawan Aasudaram Budhwani, Amravati (IN)

(73) Assignee: Qualcomm Incorporated, San Diego, CA (US)

( * ) Notice: Subject to any disclaimer, the term of this patent is extended or adjusted under 35 U.S.C. 154(b) by 345 days.

(21) Appl. No.: 18/321,619

(22) Filed: May 22, 2023

(65) Prior Publication Data

US 2024/0394838 A1 Nov. 28, 2024

(51) Int. Cl.
*G06T 5/00* (2024.01)
*G06T 5/50* (2006.01)

(52) U.S. Cl.
CPC ...... *G06T 5/50* (2013.01); *G06T 2207/20084* (2013.01)

(58) Field of Classification Search
CPC . G06T 2207/20084; G06T 2207/10016; G06T 2207/20081; G06N 3/045;
(Continued)

(56) References Cited

U.S. PATENT DOCUMENTS

| 2003/0189983 A1* | 10/2003 | Hong | H04N 19/523 348/700 |
| 2015/0043655 A1* | 2/2015 | Nilsson | G06V 20/41 375/240.26 |

(Continued)

FOREIGN PATENT DOCUMENTS

| CN | 110443173 A | * | 11/2019 | ............... G06N 3/08 |
| CN | 112465826 A | * | 3/2021 | ............... G06T 7/10 |

OTHER PUBLICATIONS

Chen D., et al., "Coherent Online Video Style Transfer", Arxiv.Org, Cornell University Library, 201 Olin Library Cornell University Ithaca, NY 14853, arXiv:1703.09211v2 [cs.CV], Mar. 27, 2017, XP080755791, Mar. 28, 2017, pp. 1-10, abstract, figures 3, 4 sections 3.1, 3.2.
Fu L-H., et al., "Video Super-Resolution Reconstruction Method Based on Deep Back Projection and Motion Feature Fusion", Multimedia Tools and Applications, Kluwer Academic Publishers, Boston, US, vol. 80, No. 8, Jan. 6, 2021, XP037426641, pp. 11423-11441, abstract section 3, figures 1-3.
International Search Report and Written Opinion—PCT/US2024/022065—ISA/EPO—Jul. 4, 2024.

*Primary Examiner* — Li Liu
(74) *Attorney, Agent, or Firm* — Polsinelli LLP

(57) ABSTRACT

Systems and techniques are provided for processing image data. For instance, a process can include classifying a first image as a key frame, based on a difference between the first image and a previous image, wherein the first image and the previous image are included in a plurality of images. A first machine learning network can generate an enhanced key frame image corresponding to the first image and a hidden state output associated with the enhanced key frame image. A second image of the plurality of images can be classified as a dependent frame, based on a similarity between the second image and the first image. A second machine learning network can generate an enhanced dependent frame image corresponding to the second image, wherein the enhanced dependent frame image is based on the second image and the hidden state output associated with the enhanced key frame image.

26 Claims, 15 Drawing Sheets

(58) Field of Classification Search
CPC ...... G06V 20/46; G06V 10/82; G06V 10/454; G06V 10/761; G06V 10/40; H04N 19/51; H04N 19/136; H04N 19/513; H04N 9/646
See application file for complete search history.

(56) References Cited

U.S. PATENT DOCUMENTS

| | | | |
|---|---|---|---|
| 2020/0285911 A1* | 9/2020 | Guo | G06V 10/82 |
| 2022/0058452 A1 | 2/2022 | Zhang et al. | |
| 2022/0398700 A1* | 12/2022 | K S | G06V 10/82 |
| 2023/0019679 A1 | 1/2023 | Chen et al. | |
| 2023/0057261 A1* | 2/2023 | Liu | H04N 19/184 |
| 2023/0269395 A1* | 8/2023 | Yang | H04N 19/513 |
| | | | 375/240.21 |
| 2024/0119601 A1* | 4/2024 | Sada | G06V 10/82 |

* cited by examiner

1100

Classify A First Image As A Key Frame, Based On A Difference Between The First Image And A Previous Image, Wherein The First Image And The Previous Image Are Included In A Plurality Of Images
1102

Generate, Using A First Machine Learning Network, An Enhanced Key Frame Image Corresponding To The First Image And A Hidden State Output Associated With The Enhanced Key Frame Image
1104

Classify A Second Image Of The Plurality Of Images As A Dependent Frame, Based On A Similarity Between The Second Image And The First Image
1106

Generate, Using A Second Machine Learning Network, An Enhanced Dependent Frame Image Corresponding To The Second Image, Wherein The Enhanced Dependent Frame Image Is Based On The Second Image And The Hidden State Output Associated With The Enhanced Key Frame Image
1108

FIG. 11

LOW-LIGHT IMAGE ENHANCEMENT USING KEY FRAME AND DEPENDENT FRAME NEURAL NETWORKS

FIELD

The present disclosure generally relates to image processing. For examples, aspects of the present disclosure relate to systems and techniques for performing low-light image enhancement using one or more machine learning models (e.g., neural networks).

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network can be implemented using computer technology inspired by logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described herein for performing low-light image (e.g., images, video frames, etc.) enhancement using a machine learning system (e.g., a neural network system or model) based on image key frames and image dependent frames. In some cases, a first neural network can be used to generate an enhanced image corresponding a low-light key frame image. A hidden state of the first neural network and corresponding to the low-light key frame image can be used by a second neural network to generate an enhanced image corresponding to one or more low-light dependent frame images. The dependent frame images can be associated with the key frame image.

According to at least one illustrative example, an apparatus for processing image data (e.g., of stand-alone images or video frames) is provided that includes a memory (e.g., configured to store data, such as audio data, etc.) and one or more processors (e.g., implemented in circuitry) coupled to the memory. The one or more processors are configured to and can: classify a first image as a key frame, based on a difference between the first image and a previous image, wherein the first image and the previous image are included in a plurality of images; generate, using a first machine learning network, an enhanced key frame image corresponding to the first image and a hidden state output associated with the enhanced key frame image; classify a second image of the plurality of images as a dependent frame, based on a similarity between the second image and the first image; and generate, using a second machine learning network, an enhanced dependent frame image corresponding to the second image, wherein the enhanced dependent frame image is based on the second image and the hidden state output associated with the enhanced key frame image.

In another example, a method is provided for processing image data (e.g., of stand-alone images or video frames), the method including: classifying a first image as a key frame, based on a difference between the first image and a previous image, wherein the first image and the previous image are included in a plurality of images; generating, using a first machine learning network, an enhanced key frame image corresponding to the first image and a hidden state output associated with the enhanced key frame image; classifying a second image of the plurality of images as a dependent frame, based on a similarity between the second image and the first image; and generating, using a second machine learning network, an enhanced dependent frame image corresponding to the second image, wherein the enhanced dependent frame image is based on the second image and the hidden state output associated with the enhanced key frame image.

In another example, a non-transitory computer-readable medium is provided that has stored thereon instructions that, when executed by one or more processors, cause the one or more processors to: classify a first image as a key frame, based on a difference between the first image and a previous image, wherein the first image and the previous image are included in a plurality of images; generate, using a first machine learning network, an enhanced key frame image corresponding to the first image and a hidden state output associated with the enhanced key frame image; classify a second image of the plurality of images as a dependent frame, based on a similarity between the second image and the first image; and generate, using a second machine learning network, an enhanced dependent frame image corresponding to the second image, wherein the enhanced dependent frame image is based on the second image and the hidden state output associated with the enhanced key frame image.

In another example, an apparatus for processing image data is provided. The apparatus includes: means for classifying a first image as a key frame, based on a difference between the first image and a previous image, wherein the first image and the previous image are included in a plurality of images; means for generating, using a first machine learning network, an enhanced key frame image corresponding to the first image and a hidden state output associated with the enhanced key frame image; means for classifying a second image of the plurality of images as a dependent frame, based on a similarity between the second image and the first image; and means for generating, using a second machine learning network, an enhanced dependent frame image corresponding to the second image, wherein the enhanced dependent frame image is based on the second image and the hidden state output associated with the enhanced key frame image.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a flowchart illustrating an example process for generating enhanced images from one or more images, in accordance with aspects of the present disclosure;

DETAILED DESCRIPTION

Figure 1A:
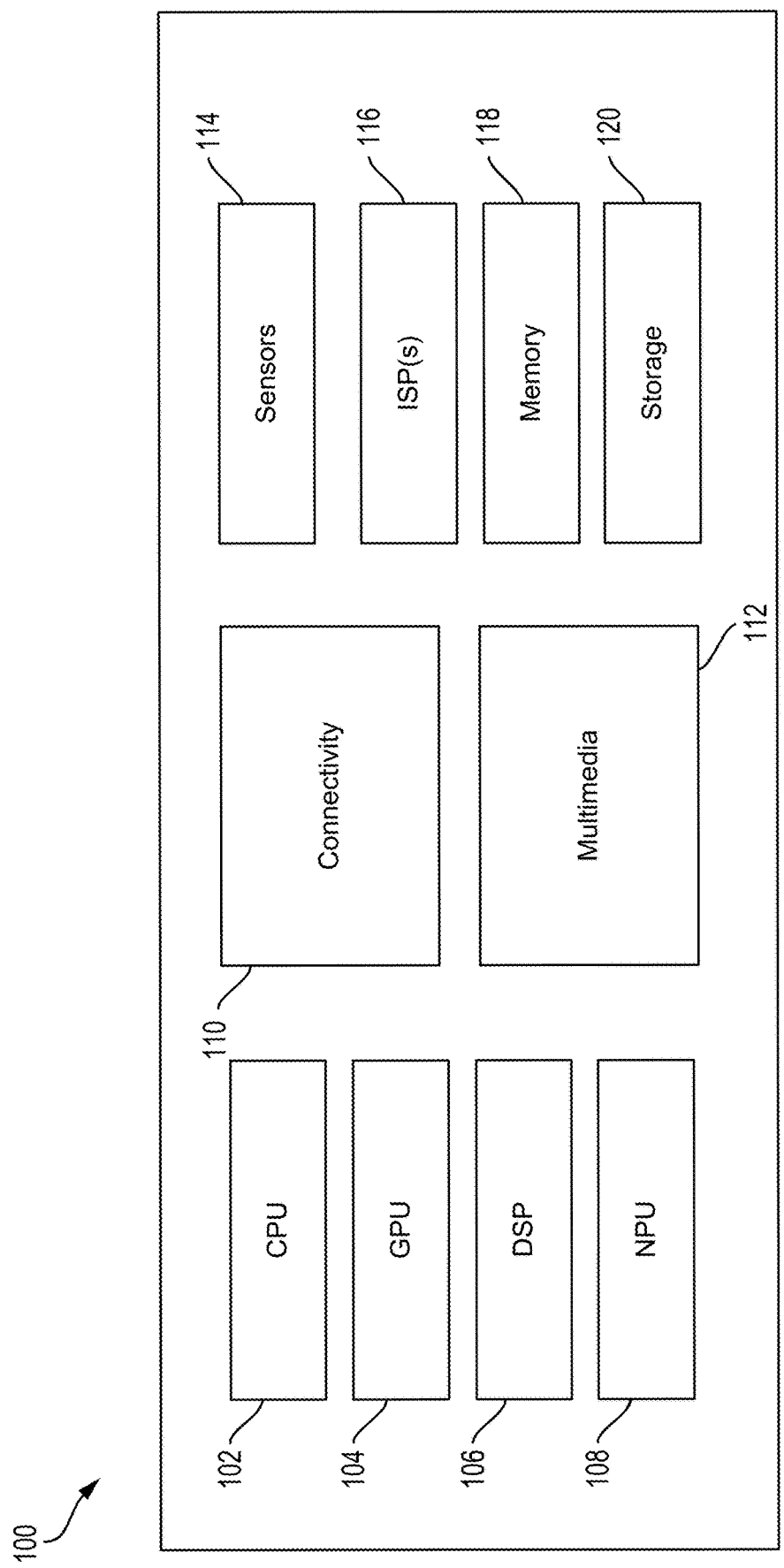
FIG. 1A illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the scope of the application as set forth in the appended claims.

As noted previously, various devices and systems allow a scene to be captured by generating images (or frames) and/or video data (including multiple frames) of the scene. A camera is a device that receives light from a scene and captures images, such as still images or video frames, using an image sensor. The terms "image," "image frame," and "frame" are used interchangeably herein. Cameras may include processors, such as image signal processors (ISPs), that can receive one or more images and process the one or more images. For example, a raw image frame captured by a camera sensor can be processed by an ISP to generate a final image. Processing by the ISP can be performed by a plurality of filters or processing blocks being applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

In some cases, various ISP operations (e.g., ISP processing blocks, including one or more of the processing blocks described above) can be implemented using one or more machine learning networks. An image processing machine network can be included in the ISP and/or can be separate from the ISP. Machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks. In some cases, an image processing machine learning network can be trained and/or implemented based on a use case associated with the input image data and/or output image data of the image processing machine learning network.

Image data (e.g., images, image frames, frames, etc., obtained using a camera) can be used for various purposes. In some examples, image data can be provided as input to a decision-making algorithm associated with surveillance, detection, and/or maneuvering, etc., use cases. For instance, a camera feed (e.g., image data) can be provided as input to an autonomous or semi-autonomous vehicle control system. The image data may in some cases be provided in combination with various other sensor inputs associated with or corresponding to the image data (e.g., sensor inputs captured at a same or similar time as the images, in a same or similar location or environment as the images, etc.). For example, image data can be used to perform tasks such as road-boundary detection, sign-board detection, pathway detection, autonomous or semi-autonomous maneuvering, surveillance monitoring, etc.

The performance of a task or decision-making algorithm that utilizes image data inputs can be based on various characteristics and properties of the image data inputs. For example, one or more (or all) of the tasks described above may experience a decrease in performance or accuracy when the image data inputs are low-light images and/or a delay in prediction or other decision-making tasks when the image data inputs are low-light images. A low-light image scenario may correspond to a reduced availability of information represented in the resulting low-light images. For instance, a road-boundary detection task becomes more difficult to perform using low-light images, in which case it may be challenging to distinguish the road boundary from other objects in the scene depicted by a low-light image. Sign-board detection and pathway detection tasks can additionally be challenging to perform using low-light images, based on the reduced visibility, contrast, and/or visual differences between the detection objects of interest and other objects depicted in the low-light image(s).

Higher-level tasks, such as autonomous or semi-autonomous maneuvering, may also be challenging to perform based on low-light images. For example, autonomous maneuvering of a vehicle can be based on a plurality of lower-level detection and/or classification tasks that run directly on the low-light images (e.g., an autonomous maneuvering task can be based on lower-level tasks such as road-boundary detection, sign-board detection, pathway detection, road paint detection, etc.). In some examples, a degradation in the output quality of each lower-level task (e.g., based on the lower-level task receiving as input a low-light image) can affect the ability to perform the higher-level task.

For example, existing techniques for implementing camera (e.g., image processing) pipelines may incur accuracy losses during low-light scenarios (e.g., when low-light images are provided as input to the camera pipeline). Accuracy losses in the camera or image processing pipeline can cause downstream delays and inconsistency in higher-level and/or decision-making tasks, as noted above, which may be undesirable for real-time systems. In some cases, additional hardware can be used to compensate for the accuracy losses associated with low-light image processing. The additional hardware can be sensor hardware (e.g., infrared or other night-vision camera sensors; sensing or mapping systems such as lidar, radar, sonar, time-of-flight (ToF) depth estimation, etc.), can be auxiliary hardware (e.g., lighting systems activated during ambient or environmental low-light scenarios). The use of additional hardware to compensate for accuracy losses associated with low-light image scenarios can increase the cost of the camera or imaging device, can increase the complexity and decrease the robustness of the camera or imaging device, and/or can increase the power utilization of the camera or imaging device.

There is a need for systems and techniques that can be used to perform improved image processing during low-light image scenarios (e.g., improved image processing for low-light images). There is a further need for systems and techniques that can be used to perform low-light image processing without using additional hardware as described above. There is also a further need for systems and techniques that can be used to perform low-light image processing in combination with existing camera and image processing pipelines.

Systems, apparatuses, processes (also referred to as methods), and computer-readable media (collectively referred to as "systems and techniques") are described herein for performing low-light image enhancement using a machine learning system to generate enhanced image key frames and enhanced image dependent frames. In some examples, the machine learning system can include a first machine learning network (e.g., a neural network) for generating enhanced images corresponding to low-light image key frames (e.g., a low-light image identified as a key frame). The machine learning system can additionally include a second machine learning network (e.g., neural network) for generating enhanced images corresponding to low-light dependent images or frames (e.g., a low-light image identified as a non-key frame and/or identified as being dependent on a previously identified key frame image).

In some aspects, a hidden state of the first machine learning network (e.g., used to generate a low-light enhanced image corresponding to a key frame) can be used by the second machine learning network to generate low-light enhanced images corresponding to the one or more dependent frames associated with the key frame. In some examples, the first machine learning network can be a deep neural network (DNN). In some cases, the first machine learning network can be implemented using a quantized DNN model. The first machine learning network can perform key frame enhancement to enhance a low-light key frame received as input. The first machine learning network can generate as output an enhanced output frame corresponding to the low-light key frame input. In some aspects, the first machine learning network can be referred to as a "key frame network," a "key frame image enhancement network," and/or a "key frame enhancement network."

The second machine learning network can be implemented as a recurrent neural network (RNN). In some aspects, the second machine learning network can generate enhanced output frames corresponding to low-light dependent frame inputs. The second machine learning network can also be referred to as a "dependent frame network," a "dependent frame image enhancement network," and/or a "dependent frame enhancement network." In one illustrative example, the dependent frame enhancement network can generate enhanced output frames in a shorter inference time than the key frame enhancement network. The dependent frame enhancement network may also generate enhanced output frames at a higher power efficiency than the key frame enhancement network. In some examples, the dependent frame enhancement network can generate enhanced output frames for one or more dependent frames, where the enhanced output frames are generated based on a hidden state associated with the particular key frame corresponding to the one or more dependent frames.

In some aspects, the key frame image enhancement model can generate an enhanced output frame corresponding to a low-light key frame input based on processing the luma and chroma components of the low-light key frame input. For example, the low-light key frame input can be split into its luma (Y) and chroma (U, V) components. The luma (e.g., Y) frame can be enhanced using a luminance enhancement machine learning network included in the key frame image enhancement model. In some aspects, the luminance enhancement machine learning network can be implemented based on a UNet architecture. The U and V chroma frames can be enhanced using a chrominance enhancement machine learning network included in the key frame image enhancement model. In some aspects, the chrominance enhancement machine learning network can be implemented based on a residual Conv-Net architecture.

The luminance enhancement machine learning network can be used to preserve and/or enhance details represented in the low-light key frame input. The chrominance enhancement machine learning network can be used to enhance the color information represented in the low-light key frame input. The chroma-enhanced output (e.g., generated by the chrominance enhancement network) can be fused with a hidden state of the luma enhancement network. In some examples, the chroma-enhanced output can be concatenated with the hidden state of the luma enhancement network, and the used to generate the final enhanced key frame image that is output by the key frame image enhancement model.

A hidden state of the key frame image enhancement model can be output to the dependent frame image enhancement model. The hidden state of the key frame image enhancement model can be different than the hidden state of the luma enhancement network that is concatenated with the chroma-enhanced output. For example, the hidden state of the key frame model can be obtained (and provided to the dependent frame model) after the luma-chroma concatenation has been performed with an earlier (e.g., different) hidden state of the key frame model.

The dependent frame image enhancement model can generate an enhanced output frame corresponding to a low-light dependent frame input, based on processing a downscaled version of the luma (e.g., Y) frame of each dependent frame in combination with the hidden state output of the key frame image enhancement model. The key frame model hidden state can be the hidden state output generating while processing the particular key frame that is also associated with each of the dependent frames currently being processed by the dependent frame model. Based on receiving the key frame hidden state as input, the dependent frame image enhancement model can skip processing the color components of each dependent frame (e.g., the U and V components of each dependent frame). In one illustrative example, the dependent frame image enhancement model can perform enhancement operations based on the downscaled version of the luma components of the dependent frame, and may use the corresponding key frame hidden state information (e.g., features) to generate accurate results with enhanced colors. In some aspects, performing enhancement operations based on the downscaled version of the luma components of the dependent frame can be associated with improved performance and power efficiency of the dependent frame image enhancement model. In some aspects, the dependent frame image enhancement model can downscale the luma (e.g., Y) frame of each dependent frame image by a factor of four (e.g., the downscaled luma frame has height and width pixel dimensions that are four times less than the height and width pixel dimensions of the input luma frame/the input dependent frame image).

Various aspects of the present disclosure will be described with respect to the figures.

FIG. 1A illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform depth completion according to aspects of the present disclosure. In some cases, by using a graph-based neural network with a segmentation input and a depth input each associated with a same image, aspects of the present disclosure can increase the accuracy and efficiency of generating dense depth maps from an image input and a sparse depth input.

SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Figure 1B:
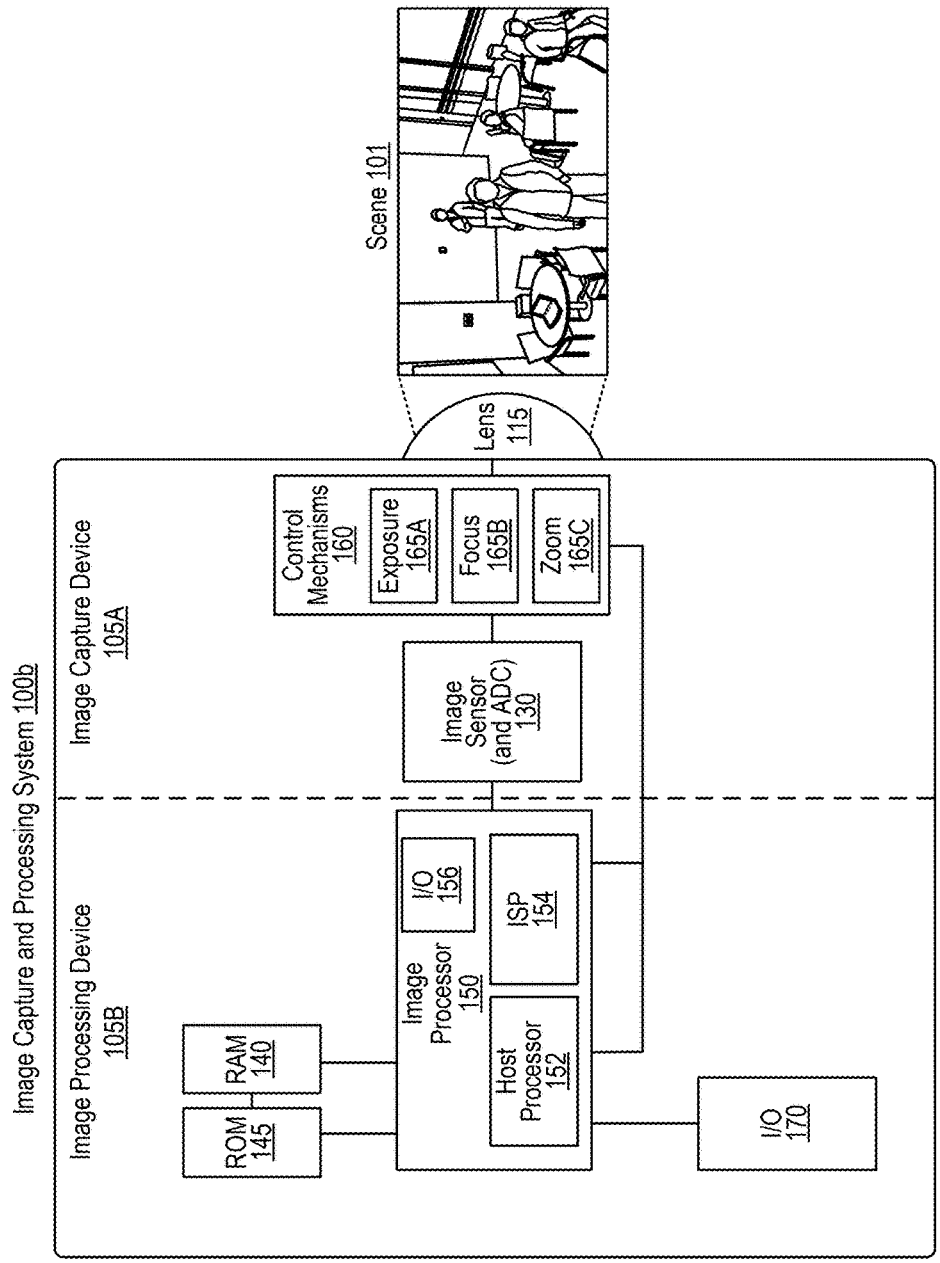
FIG. 1B is a block diagram illustrating an example architecture of an image capture and processing system, in accordance with some examples.

FIG. 1B is a block diagram illustrating an architecture of an image capture and processing system 100b. The image capture and processing system 100b includes various components that are used to capture and process images of scenes (e.g., an image of a scene 101). The image capture and processing system 100b can capture standalone images (or photographs) and/or can capture videos that include multiple images (or video frames) in a particular sequence. A lens 115 of the system 100b faces a scene 101 and receives light from the scene 101. The lens 115 bends the light toward the image sensor 130. The light received by the lens 115 passes through an aperture controlled by one or more control mechanisms 160 and is received by an image sensor 130.

The one or more control mechanisms 160 may control exposure, focus, and/or zoom based on information from the image sensor 130 and/or based on information from the image processor 150. The one or more control mechanisms 160 may include multiple mechanisms and components; for instance, the control mechanisms 160 may include one or more exposure control mechanisms 165A, one or more focus control mechanisms 165B, and/or one or more zoom control mechanisms 165C. The one or more control mechanisms 160 may also include additional control mechanisms besides those that are illustrated, such as control mechanisms controlling analog gain, flash, HDR, depth of field, and/or other image capture properties.

The focus control mechanism 165B of the control mechanisms 160 can obtain a focus setting. In some examples, focus control mechanism 165B store the focus setting in a memory register. Based on the focus setting, the focus control mechanism 165B can adjust the position of the lens 115 relative to the position of the image sensor 130. For example, based on the focus setting, the focus control mechanism 165B can move the lens 115 closer to the image sensor 130 or farther from the image sensor 130 by actuating a motor or servo, thereby adjusting focus. In some cases, additional lenses may be included in the system 100b, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 160, the image sensor 130, and/or the image processor 150. The focus setting may be referred to as an image capture setting and/or an image processing setting.

The exposure control mechanism 165A of the control mechanisms 160 can obtain an exposure setting. In some cases, the exposure control mechanism 165A stores the exposure setting in a memory register. Based on this exposure setting, the exposure control mechanism 165A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 165C of the control mechanisms 160 can obtain a zoom setting. In some examples, the zoom control mechanism 165C stores the zoom setting in a memory register. Based on the zoom setting, the zoom control mechanism 165C can control a focal length of an assembly of lens elements (lens assembly) that includes the lens 115 and one or more additional lenses. For example, the zoom control mechanism 165C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 101 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 165C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 160 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 910 discussed with respect to the computing system 900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image downsampling, pixel interpolation, automatic exposure (AE) control, automatic gain control (AGC), CDAF, PDAF, automatic white balance, merging of images to form an HDR image, image recognition, object recognition, feature recognition, receipt of inputs, managing outputs, managing memory, or some combination thereof. The image processor 150 may store images and/or processed images in random access memory (RAM) 140/1425, read-only memory (ROM) 145/1420, a cache 1412, a memory unit (e.g., system memory 1415), another storage device 1430, or some combination thereof.

Various input/output (I/O) devices 170 may be connected to the image processor 150. The I/O devices 170 can include a display screen, a keyboard, a keypad, a touchscreen, a trackpad, a touch-sensitive surface, a printer, any other output devices 1435, any other input devices 1445, or some combination thereof. In some cases, a caption may be input into the image processing device 105B through a physical keyboard or keypad of the I/O devices 170, or through a virtual keyboard or keypad of a touchscreen of the I/O devices 170. The I/O 156 may include one or more ports, jacks, or other connectors that enable a wired connection between the system 100b and one or more peripheral devices, over which the system 100b may receive data from the one or more peripheral device and/or transmit data to the one or more peripheral devices. The I/O 156 may include one or more wireless transceivers that enable a wireless connection between the system 100b and one or more peripheral devices, over which the system 100b may receive data from the one or more peripheral device and/or transmit data to the one or more peripheral devices. The peripheral devices may include any of the previously-discussed types of I/O devices 170 and may themselves be considered I/O devices 170 once they are coupled to the ports, jacks, wireless transceivers, or other wired and/or wireless connectors.

In some cases, the image capture and processing system 100b may be a single device. In some cases, the image capture and processing system 100b may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1B, a vertical dashed line divides the image capture and processing system 100b of FIG. 1B into two portions that represent the image capture device 105A and the image processing device 105B, respectively. The image capture device 105A includes the lens 115, control mechanisms 160, and the image sensor 130. The image processing device 105B includes the image processor 150 (including the ISP 154 and the host processor 152), the RAM 140, the ROM 145, and the I/O 156. In some cases, certain components illustrated in the image capture device 105A, such as the ISP 154 and/or the host processor 152, may be included in the image capture device 105A.

The image capture and processing system 100b can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100b can include one or more wireless transceivers for wireless communications, such as cellular network communications, 802.11 Wi-Fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100b is shown to include certain components, one of ordinary skill will appreciate that the image capture and processing system 100b can include more components than those shown in FIG. 1B. The components of the image capture and processing system 100b can include software, hardware, or one or more combinations of software and hardware. For example, in some implementations, the components of the image capture and processing system 100b can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100b.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past images. The host processor 152 can also dynamically configure the parameter settings of the internal pipelines or modules of the ISP 154 to match the settings of one or more input images from the image sensor 130 so that the image data is correctly processed by the ISP 154. Processing (or pipeline) blocks or modules of the ISP 154 can include modules for lens (or sensor) noise correction, de-mosaicing, color conversion, correction or enhancement/suppression of image attributes, denoising filters, sharpening filters, among others. Each module of the ISP 154 may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
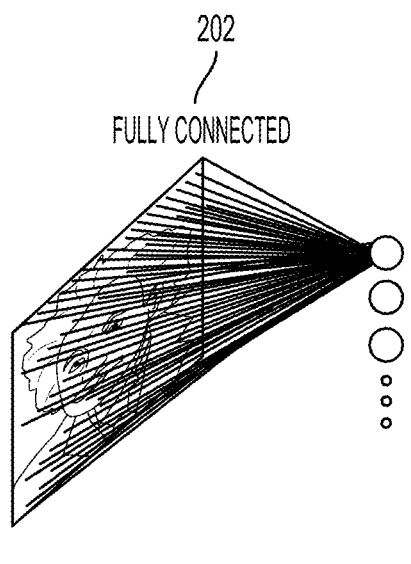
FIG. 2A illustrates an example of a fully connected neural network, in accordance with some examples.
Figure 2B:
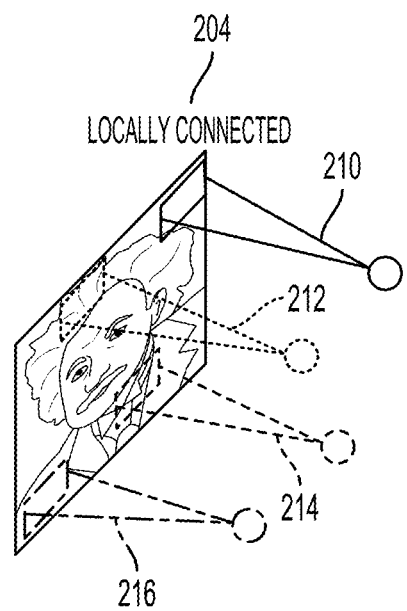
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
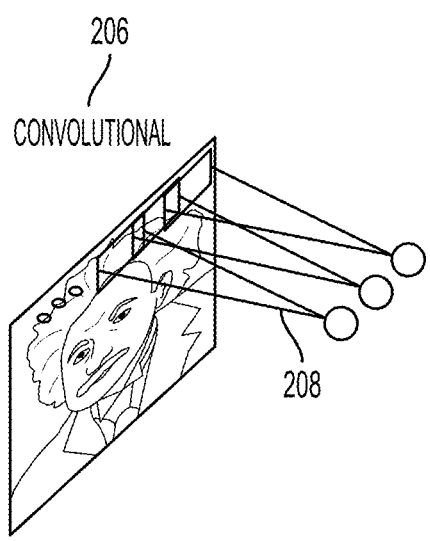
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of image processing, according to aspects of the present disclosure. An illustrative example of a deep learning network is described in greater depth with respect to the example block diagram of FIG. 12. An illustrative example of a convolutional neural network is described in greater depth with respect to the example block diagram of FIG. 13.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
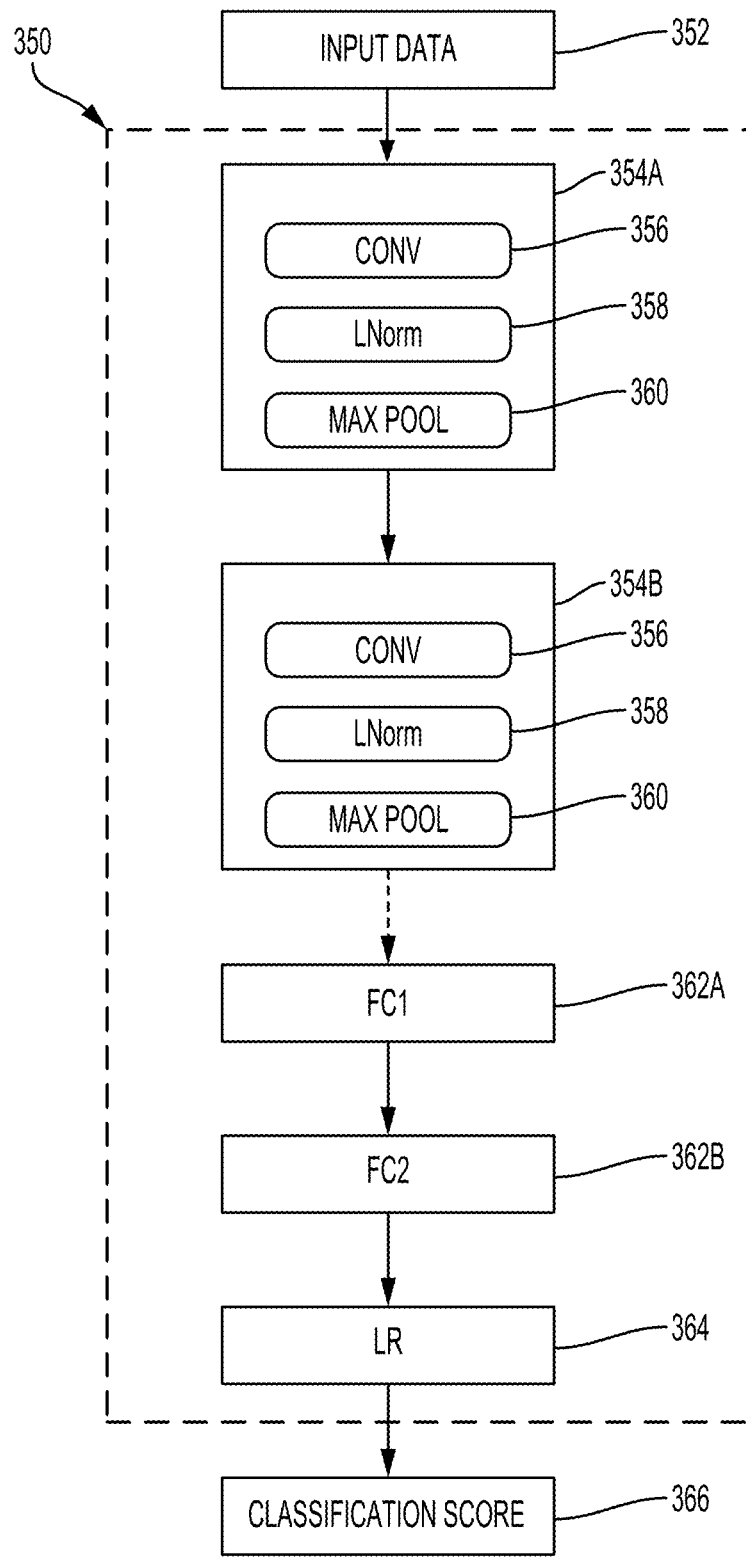
FIG. 3 is a block diagram illustrating another example DCN, in accordance with some examples.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preferences. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 and/or an image capture and processing system 100b to achieve high performance and low power consumption. In some examples, the parallel filter banks may be loaded on the DSP 106 or an ISP 116 of an image processing system 100 as depicted in FIG. 1, may be loaded on the image processor 150 of the image processing device 105B of FIG. 1B, and/or may be loaded on the image capture device 105A of FIG. 1B. The deep convolutional network 350 may access other processing blocks that may be present on the image processing system 100 of FIG. 1A and/or the image capture and processing system 100b of FIG. 1B.

The deep convolutional network 350 may include one or more fully connected layers, such as layer 362A (labeled "FC1") and layer 362B (labeled "FC2"). The deep convolutional network 350 may include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities. For instance, in some classification tasks, each probability is the probability of the input data including a feature from a set of features. In some examples, each probability is the probability of the input data belonging to a particular class (e.g., classification) of one or more classes.

As mentioned previously, the systems and techniques described herein can be used to perform low-light image enhancement using a first machine learning network to generate enhanced output images corresponding to key frame images and using a second machine learning network to generate enhanced output images corresponding to dependent frame images. The key frame images and the dependent frame images can be included in a plurality of input images. The plurality of input images can be associated with a sequential order, such as a time-based sequential order. In some cases, the plurality of input images can be a time-series of video frames (e.g., images). A key frame can be associated with one or more dependent frames, wherein the one or more dependent frames are after the key frame in the sequential order. As used herein, a "key frame" can refer to an image (e.g., of the plurality of input images) identified as a key frame, and a "dependent frame" can refer to an image (e.g., of the plurality of images) identified as a dependent frame and/or corresponding to a key frame.

Figure 4:
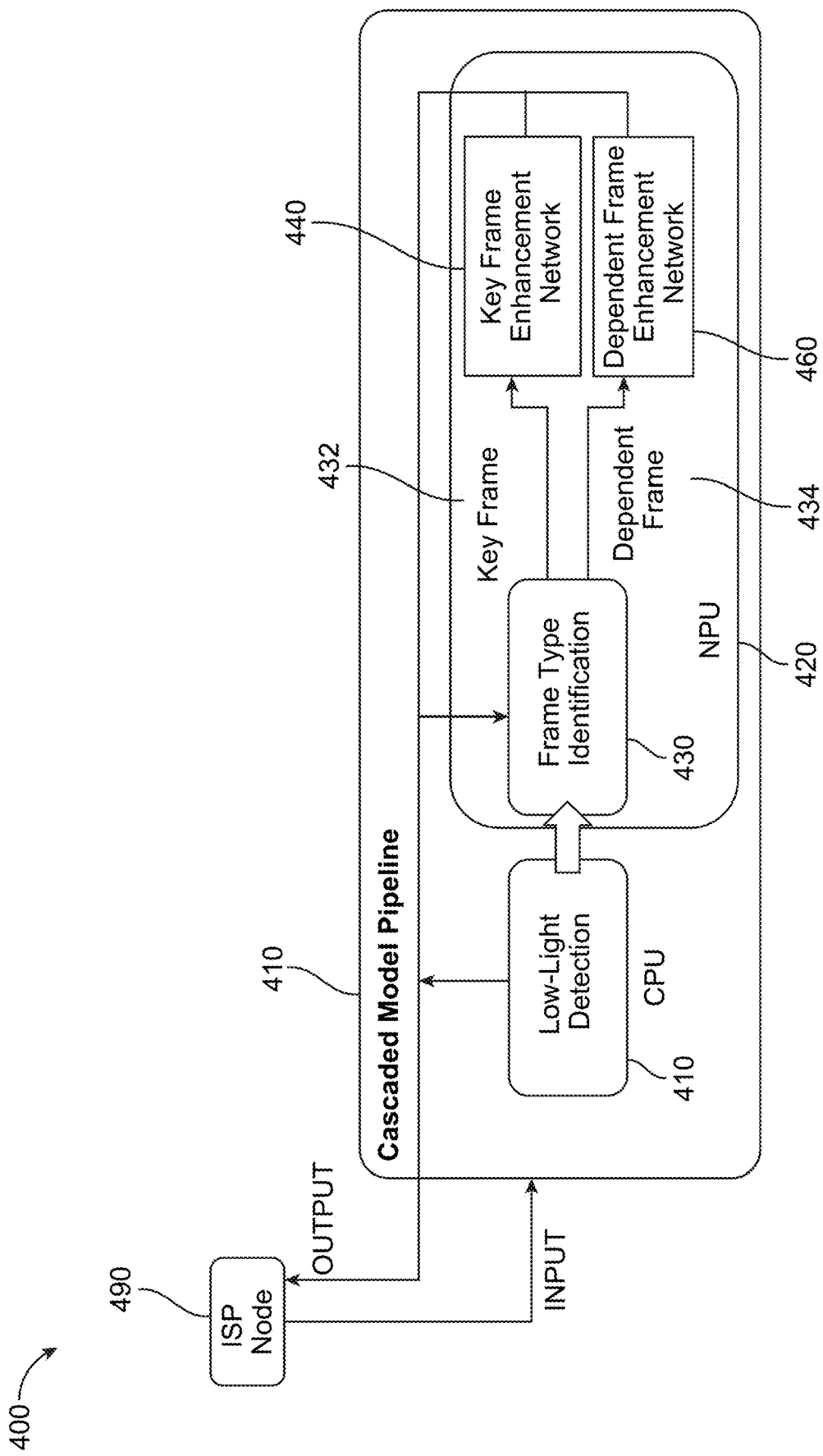
FIG. 4 is a diagram illustrating an example of a cascaded model pipeline that can be used to perform low-light image enhancement for image key frames and image dependent frames, in accordance with some examples.

FIG. 4 is a diagram 400 illustrating an example of a cascaded model pipeline 410 that can be used to perform low-light image enhancement for image key frames and image dependent frames, in accordance with some examples. The cascaded model pipeline 410 can be implemented as a cascaded low-light image enhancement pipeline. For example, cascaded model pipeline 410 can include a low-light detection engine 410, a frame type identification engine 430, a key frame enhancement network 440, and a dependent frame enhancement network 460.

Figure 6:
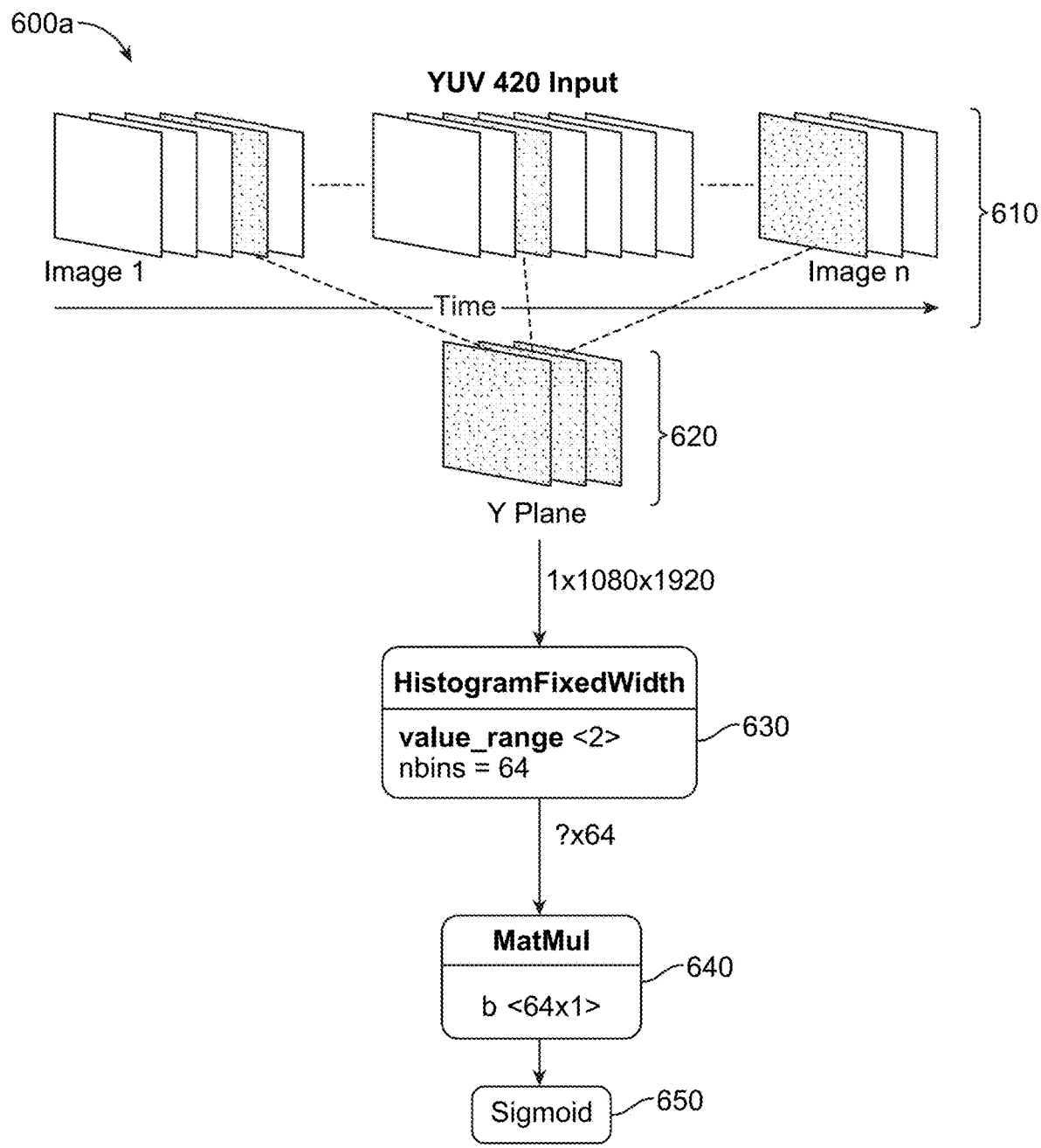
FIG. 6 is a diagram illustrating an example of a low-light detection machine learning architecture, in accordance with some examples.

The low-light detection engine 410 can be implemented using a low-light detection machine learning network (e.g., such as the low-light detection machine learning model 600 described with respect to FIG. 6). Low-light detection engine 410 can receive as input one or more images (e.g., one or more images or frames at regular intervals) and generate an output indicative of whether each respective input image (e.g., or batch of images) is a low-light image or a non-low light image.

In some aspects, the low-light detection engine 410 (e.g., and/or the low-light detection machine learning model 600 of FIG. 6) can be implemented on a CPU. For example, low-light detection engine 410 can be implemented on a CPU of an image processing device, such as the CPU 102 of FIG. 1A, the host processor 152 of FIG. 1B, the processor 1410 of FIG. 14, etc.

In some aspects, the frame type identification engine 430, the key frame enhancement network 440, and/or the dependent frame enhancement network 460 can be implemented on an NPU 420. For example, the NPU 420 can be included on the same image processing device as the CPU used to implement low-light detection engine 410. In some cases, the NPU 420 can be the same as or similar to the NPU 108 of FIG. 1A. In some examples, the NPU 420 can be included in one or more of the image processor 150, the host processor 152, and/or the ISP 154 of the image processing device 105B of FIG. 1B. IN another example, the NPU 420 can be included in or implemented by the image processing device 105B, separate from the illustrated components of image processing device 105B depicted in FIG. 1B. In some cases, the NPU 420 can be included in or implemented by the image capture device 105A, within or separate from the illustrated components of the image capture device 105A depicted in FIG. 1B.

In one illustrative example, the low-light detection engine 410 can be a machine learning network that is the same as or similar to the low-light detection machine learning network 600 depicted in FIG. 6. In some aspects, low-light detection can be performed based on a subset of images 620 selected from a larger plurality of images 610. The plurality of images 610 can be a time-series or other set of sequential images. For instance, the 'frame n' depicted on the far-right of FIG. 6 can be obtained at a later point in time (or a later point in a sequential order) than the frame '1' depicted on the far-left of FIG. 6.

In some examples, the subset of images 620 can be obtained from the plurality of images 610 using a predetermined interval. For instance, the subset of images 620 can be obtained using an interval of 3 frames, where the subset of images 620 includes every third or fourth frame of the plurality of images 610.

In some cases, the plurality of images 610 can be YUV images (also referred to as YUV frames or YUV image frames). For instance, the plurality of images 610 can be a YUV 420 format image data. In the YUV 420 image format, luma (e.g., Y) samples of an image are separate from chroma (e.g., U and V) samples of the same image. The Y samples can be indicative of grayscale (e.g., brightness) information of each pixel of the image. The U and V chroma samples can be indicative of color-difference information of pixels of the image (e.g., the U samples can indicate blue-luma, the V samples can indicate red-luma). The YUV 420 image format can also be referred to as YUV 4:2:0. The luma information (e.g., Y samples) can have the same resolution (e.g., size or quantity of pixels) as the full YUV image. The chroma information can be subsampled relative to the full resolution. For instance, in the YUV 420 image format, both the U and the V chroma samples can include four times fewer pixels than the Y luma samples (e.g., the U and V samples have a vertical resolution ½ that of the Y luma samples, and have a horizontal resolution ½ that of the Y luma samples).

In one illustrative example, low-light detection can be performed based on the Y luma samples (e.g., luminance information) of an image. In some aspects, the subset of images 620 can include only luma frames (e.g., Y samples) of the plurality of YUV images 610. In some cases, the subset of images 620 can include the luma frame corresponding to each YUV image of the plurality of YUV images. In another example, the subset of images 620 can include luma frames corresponding to YUV images selected at a pre-determined interval from the plurality of YUV images (e.g., every third or fourth luma frame (e.g., Y sample) of the plurality of YUV frames 610).

The low-light detection model 600 can perform low-light detection based on histogram information corresponding to the luma samples 620. For instance, a histogram engine 630 can be used to generate one or more histograms corresponding to each luma sample of the luma samples 620. The histograms can be generated to have a constant quantity of bins, such as 64 bins. In some aspects, each histogram can be generated based on distributing the pixels (e.g., of each luma sample 620) into 64 bins using BitShift Hash. Histograms of luma information can be indicative of information of image characteristics such as contrast, brightness, intensity distribution, etc.

Figure 5:
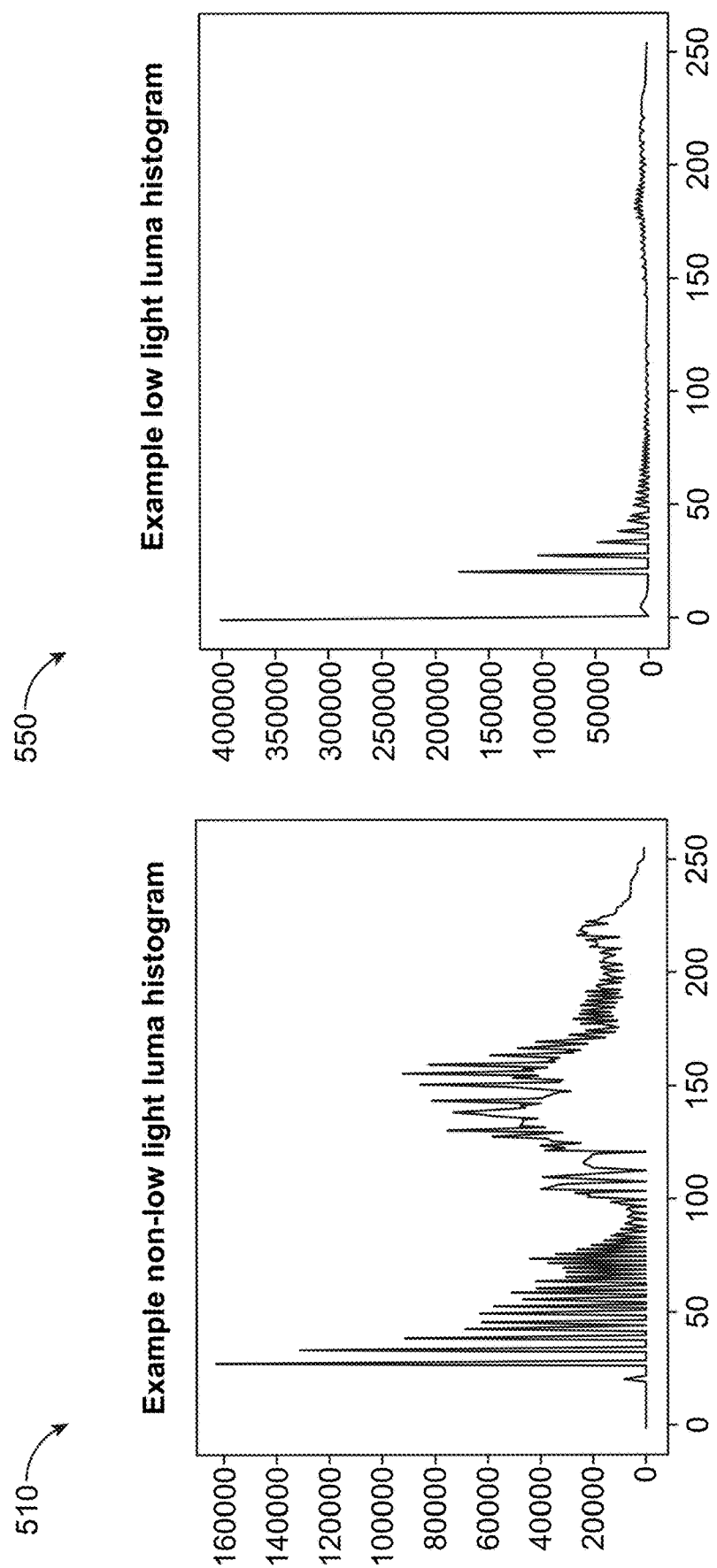
FIG. 5 is a diagram illustrating a histogram corresponding to a low-light image and a histogram corresponding to a non-low light image, in accordance with some examples.

FIG. 5 is a diagram illustrating an example histogram 550 corresponding to a low-light image and a histogram 510 corresponding to a non-low-light image, in accordance with some examples. In some examples, low-light images can be associated with histograms that are similar to the example low-light histogram 550, in which the histogram distribution is shifted towards the left (e.g., based on the low pixel intensities/luma values associated with and present in low-light images). As depicted in FIG. 5, non-low light images can be associated with histograms such as the non-low light histogram 510, in which the histogram distribution includes a greater quantity of higher pixel intensities/luma values (e.g., the histogram bins on the right side of each histogram).

The low-light detection model 600 of FIG. 6 can include a matrix multiplication engine 640 (e.g., "MatMul") with learned weights that amplify low-intensity pixel bins of histograms generated by the histogram engine 630, and that suppress normal and high-intensity pixels bins of the histograms generated by the histogram engine 630. The low-light detection model 600 can perform low-light detection based on a binary classification using the matrix multiplication output 640 and a sigmoid function 650. The binary classification can be implemented using the sigmoid function 650, where the sigmoid 650 outputs a strong 1 for a low-light image and a 0 for a standard (e.g., non-low light image). The binary classification of low-light detection model 600 can be based on a learned percentile threshold value over the output of the matrix multiplication output 640 and/or the sigmoid 650.

In some aspects, the low-light detection engine 410 of the cascaded model pipeline 410 depicted in FIG. 4 can be implemented based on a lux index, which may be determined by an ISP and/or image capture device associated with the input images being processed by the cascaded model pipeline 410. For instance, low-light detection engine 410 can output a value of '1', indicative of a low-light image, based on a lux index or other low-light identification information received from an ISP (e.g., ISP 154 of FIG. 1B) and/or received from an image capture device (e.g., image capture device 105A of FIG. 1B). In some cases, lux index information and/or other low-light identification information used to bypass the low-light detection engine 410 of cascaded model pipeline 410 can be received from an ISP node 490.

For example, as depicted in FIG. 4, the cascaded model pipeline 410 can be associated with an ISP node 490. The ISP node 490 can provide as input to the cascaded model pipeline 410 the one or more images (e.g., of a plurality of images) described above and herein. Additionally, the ISP node 490 can receive the output enhanced images generated by the cascaded model pipeline 410. In one illustrative example, the ISP node 490 can be a processing block or other node that can be used to implement the cascaded model pipeline 410 in combination with various image processing pipelines, ISPs, etc. For instance, ISP node 490 can be included in the DSP 106 of FIG. 1A and used to implement the cascaded model pipeline 410 in one or more image processing pipelines associated with the DSP 106. In another example, ISP node 490 can be included in the ISP 154 and/or image processor 150 of FIG. 1B, and used to implement the cascaded model pipeline 410 in one or more image processing pipelines associated with the image processing device 105B of FIG. 1B. In some examples, the ISP node 490 can provide as input to the cascaded model pipeline 410 images in a YUV 4:2:0 format and/or can receive as output from the cascaded model pipeline 410 enhanced images in a YUV 4:2:0 format. In some aspects, the output from the cascaded model pipeline 410 can be an enhanced image generated using key frame enhancement network 440 or an enhanced image generated using dependent frame enhancement network 460. The enhanced images can have a same format and resolution as the input images obtained from ISP node 490. Enhanced dependent frame images (e.g., generated by the dependent frame image enhancement network 460) can have a same format and resolution as enhanced key frame images (e.g., generated by the key frame image enhancement network 440).

When a low-light image is determined or otherwise identified by the low-light detection engine 410 and/or based on lux index information obtained from the ISP node 490, frame type identification engine 430 can be used to identify the low-light image as either a key frame 432 or a dependent frame 434. In some aspects, frame type identification engine 430 may only receive an input image if the input image has previously been identified as a low-light image by low-light detection engine 410. In some examples, frame type identification engine 430 may receive as input each image of a plurality of images, wherein each respective image provided to frame type identification engine 430 is associated with a corresponding indicator of a low-light identification or a non-low light identification determined for the respective image by the low-light detection engine 410.

In one illustrative example, frame type identification engine 430 can classify an image as either a key frame 432 or a dependent frame 434 based on comparing the current image to one or more previous images (e.g., where the current image and the one or more previous images are included in the same plurality of images). For instance, frame type identification engine 430 can compare a current image frame $F_t$ (e.g., associated with time t) to a previous image frame $F_{t-1}$ (e.g., associated with a time t−1).

In some aspects, the frame type identification engine 430 can include one or more convolutional layers trained to extract (e.g., generate) image features. The pre-trained residual blocks (e.g., associated with the one or more convolutional layers) can generate a first set of features corresponding to the current image frame $F_t$ and a second set of features corresponding to the previous image frame $F_{t-1}$. The generated features can be provided from the output of the one or more convolutional layers to an input of one or more maxpooling layers also included in the frame type identification engine. The maxpooling layers can output a first set of pooled features (e.g., corresponding to the generated features for the current image frame $F_t$) and a second set of pooled features (e.g., corresponding to the generated features for the previous image frame $F_{t-1}$).

The frame type identification engine 430 can perform motion detection between $F_t$ and $F_{t-1}$, using the corresponding first and second sets of pooled features, respectively. In one illustrative example, frame type identification engine 430 can determine the amount of motion between the current frame $F_t$ and the previous frame $F_{t-1}$ based on a Euclidean distance between the $F_t$ pooled features and the $F_{t-1}$ pooled features. In some aspects, the Euclidean distance between the two sets of pooled features can be determined based on subtracting the first set of pooled features from the second set of pooled features, or vice versa. A residual frame can be generated indicative of the Euclidean distance (e.g., difference) between the current frame $F_t$ features and the previous frame $F_{t-1}$ features at each pixel location of the two frames (e.g., the two frames can each have the same pixel dimensions, and a particular pixel location in $F_t$ can have a corresponding particular location in $F_{t-1}$).

The residual, indicative of the Euclidean distance between the current frame $F_t$ features and the previous frame $F_{t-1}$ features, can be provided to one or more fully connected (FC) layers of the frame type identification engine 430. The one or more fully connected layers can be used to classify the motion represented in the Euclidean distance residual into a "small motion" class or a "large motion" class. In one illustrative example, the one or more fully connected layers generate an output comprising a single number with a value between 0 and 1. In some aspects, the value between 0 and 1 is indicative of the probability of a large motion being present between the current image frame $F_t$ and the previous image frame $F_{t-1}$. In some aspects, the frame type identification engine 430 can be trained using a training data set of video decoded frames obtained from a plurality of video files (e.g., MP4 files). I frames of the video files can be utilized during training as the key frames 432. Dependent frames are motion-based frames, and the P and B frames of the video files can be utilized during training as the dependent frames 434.

In one illustrative example, the value output by the fully connected layers can be referred to as a "perceptual similarity index," S, where a value of '1' is indicative of the highest similarity (e.g., no motion between $F_t$ and $F_{t-1}$) and a value of '0' is indicative of no similarity. In some aspects, one or more thresholds can be used to classify a low-light image as either a key frame 432 or a dependent frame 434, based on comparing the perceptual similarity index S to the one or more thresholds.

For instance, a key frame 432 can be a low-light image frame that is dissimilar to the previous image frame (e.g., frame type identification engine 430 determines a perceptual similarity index S that is less than a threshold). A dependent frame 434 can be a low-light image frame that is similar to the previous image (e.g., frame type identification engine 430 determines a perceptual similarity index that is greater than the threshold). In some aspects, a key frame 432 can follow a dependent frame 434 (e.g., the current frame $F_t$ is identified as a key frame based on a comparison with a previous dependent frame $F_{t-1}$). In another example, a key frame can follow another key frame (e.g., current frame $F_t$ and previous frame $F_{t-1}$ are both key frames). A dependent frame can follow a key frame (e.g., $F_t$ is identified as a dependent frame based on a comparison with a previous key frame $F_{t-1}$). A dependent frame can also follow another dependent frame (e.g., $F_t$ and $F_{t-1}$ are both dependent frames).

Based on the identification performed by frame type identification engine 430, each low-light image is identified as a key frame 432 or a dependent frame 434. In one illustrative example, key frames 432 can be processed (e.g., enhanced) using a key frame image enhancement machine learning network 440, and dependent frames 434 can be processed (e.g., enhanced) using a dependent frame image enhancement machine learning network 460). The key frame image enhancement network 440 may be the same as or similar to the key frame image enhancement network 700 of FIG. 7 and/or the DNN 930 of FIG. 9. The dependent frame image enhancement network 460 may be the same as or similar to the dependent frame image enhancement network 800 of FIG. 8 and/or the RNN 940 of FIG. 9.

Figure 7:
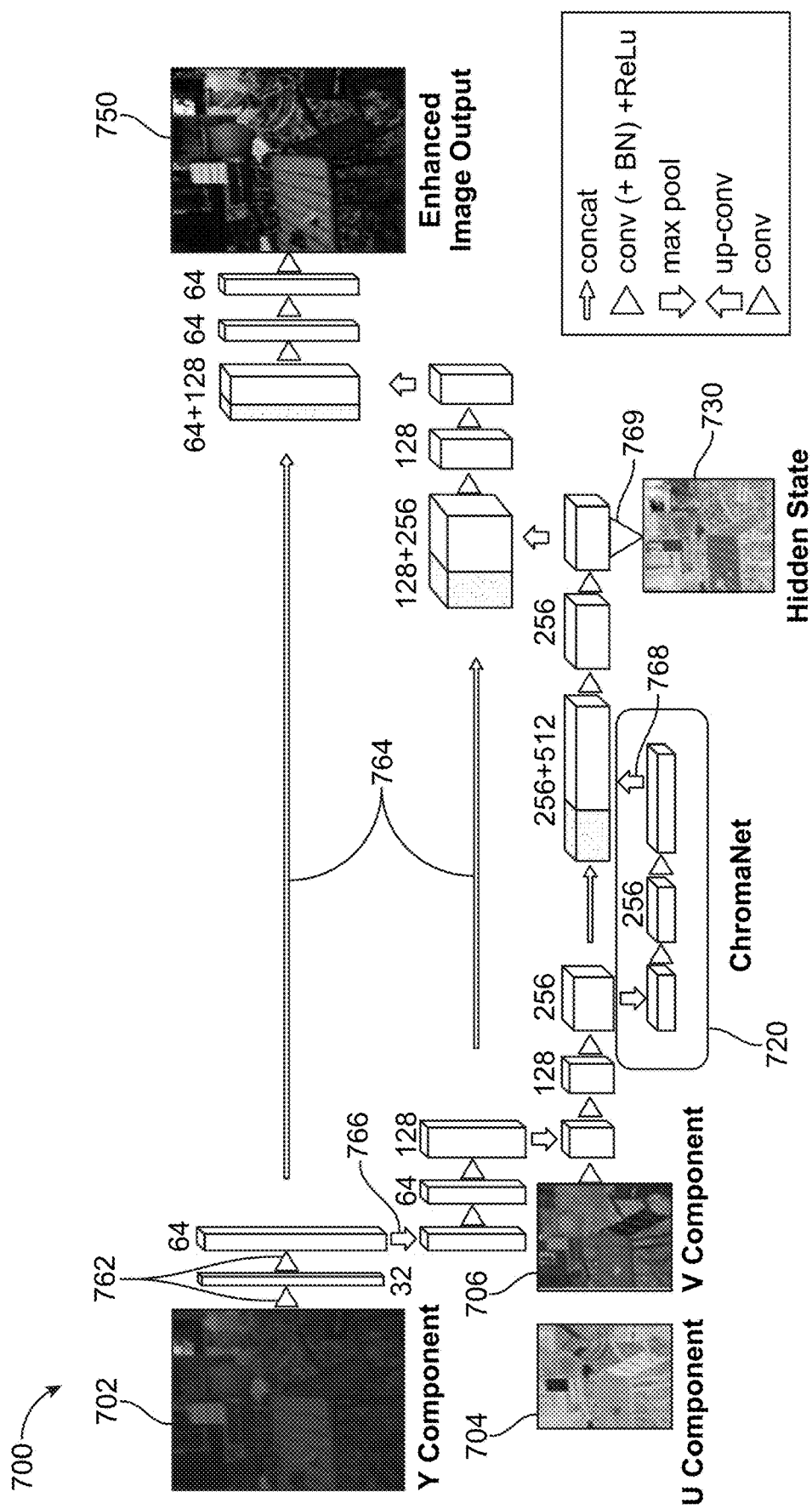
FIG. 7 is a diagram illustrating an example of a key frame image enhancement machine learning architecture, in accordance with some examples.

FIG. 7 is a diagram illustrating an example of a key frame image enhancement machine learning network 700, in accordance with some examples. In one illustrative example, the key frame image enhancement machine learning network 700 can be the same as or similar to the key frame enhancement network 440 of FIG. 4 and/or the DNN 930 of FIG. 9.

The key frame image enhancement machine learning network 700 (e.g., also referred to as the "key frame enhancement network" or the "key frame network") can receive as input a low-light YUV image. The YUV image can be identified as a low-light image as described above, for example using the low-light detection engine 410 of FIG. 4, the low-light detection model 600 of FIG. 6, lux index values from the ISP node 490 of FIG. 4, etc. In one illustrative example, the systems and techniques can perform one or more preprocessing operations to split the low-light YUV image into its respective Y (e.g., luma), U (e.g., blue color-difference chroma), and V (e.g., red color-difference chroma) components.

For instance, a low-light YUV image processed by the key frame enhancement network 700 can be the same as or similar to the low-light YUV image classified as key frame 432 by the frame type identification engine 430 of FIG. 4. The key frame 432 can be pre-processed and split into a Y-plane luma component 702, a U-plane chroma component 704, and a V-plane chroma component 706.

In some aspects, the key frame image enhancement network 700 can include a luminance enhancement sub-network and a chrominance enhancement sub-network. The luminance enhancement machine learning network can be used to preserve and/or enhance details represented in the low-light key frame input. For example, the luminance enhancement sub-network can be used to process and enhance the Y-plane luma component 702 of the key frame image. In some aspects, the Y-plane luma component 702 can be provided as input to a luminance enhancement sub-network based on a UNet architecture that can be implemented to help preserve image details during enhancement image processing operations. The chrominance enhancement sub-network 720 can also be referred to as "ChromaNet." In some aspects, the ChromaNet 720 can be implemented based on a residual Conv-Net architecture. ChromaNet 720 can be used to enhance the color information represented in the low-light key frame input. For example, the ChromaNet 720 can be used to enhance and restore a day-light color tone for the color information. The chroma-enhanced output (e.g., generated by the chrominance enhancement network 720) can be fused with a hidden state of the luma enhancement network. In some examples, the chroma-enhanced output can be concatenated with the hidden state of the luma enhancement network, and the used to generate the final enhanced key frame image 750 that is output by the key frame image enhancement network 700.

The luminance enhancement sub-network (and the chroma enhancement sub-network 720) can include a plurality of machine learning layers. For example, the Y-plane luma component 702 can be provided as input to a pair of convolutional layers 762. The convolutional layers 762 can include one or more convolutional layers, one or more batch normalization (BN) layers, and one or more rectified linear unit (ReLu) layers. The luminance enhancement sub-network can include a plurality of concatenation operations or concatenation layers 764, which can be provided between various pairs of the remaining machine learning layers of luminance enhancement sub-network and/or the overall key frame image enhancement machine learning network 700.

One or more maxpooling layers 766 can be provided to perform pooling between the output of one machine layer and the input of another machine learning layer. For example, the one or more maxpooling layers 766 can be provided between at least a portion of the convolutional+BN+ReLu layers 762.

One or more up-convolutional layers 768 can be provided to implement the key frame image enhancement network 700. For instance, an up-convolutional layer 768 can be provided at the output of ChromaNet 720 and used to fuse or concatenate the output of ChromaNet 720 with an internal hidden state of the luminance enhancement performed by the key frame enhancement network 700.

One or more additional processing steps can be performed by the key frame enhancement network 700, after generating the fused concatenation of the ChromaNet 720 output and the internal hidden state of the luminance enhancement sub-network. In some aspects, the key frame enhancement network 700 can include one or more convolutional layers 769. For example, a convolutional layer 769 can be used to generate the hidden state output 730 of the key frame image enhancement network 700. The hidden state output 730 can be different from (and generated after) the internal hidden state that is fused with the ChromaNet 720 output. As will be described in greater depth below, the hidden state output 730 of key frame enhancement network 700 can be provided as input to the dependent frame enhancement network (e.g., dependent frame enhancement network 800 of FIG. 8) and used to generate (e.g., contributes to) the one or more enhanced dependent frames 860 of FIG. 8.

The enhanced key frame image output 750 can be generated by the key frame enhancement network 700 based on the hidden state 730 representative of the fused concatenation of the luminance enhancement sub-network internal hidden state with the output of the chrominance enhancement sub-network 720. In some aspects, the key frame image enhancement network 700 can be trained based on a perceptual quality index. For instance, the perceptual quality index (PQI) can be used as a loss function for model pre-training associated with training key frame image enhancement network 700. In one illustrative example, the luminance enhancement sub-network and the ChromaNet 720 can be trained individually. Subsequently, the individually trained luminance enhancement sub-network and the individually trained ChromaNet 720 can be combined and trained end-to-end. Following the PQI-based pre-training, GAN-based fine-tuning can be performed to train the key frame image enhancement network 700 (e.g., after end-to-end training of the combined luminance enhancement sub-network and ChromaNet 720, GAIN-based fine-tuning can be performed).

Figure 8:
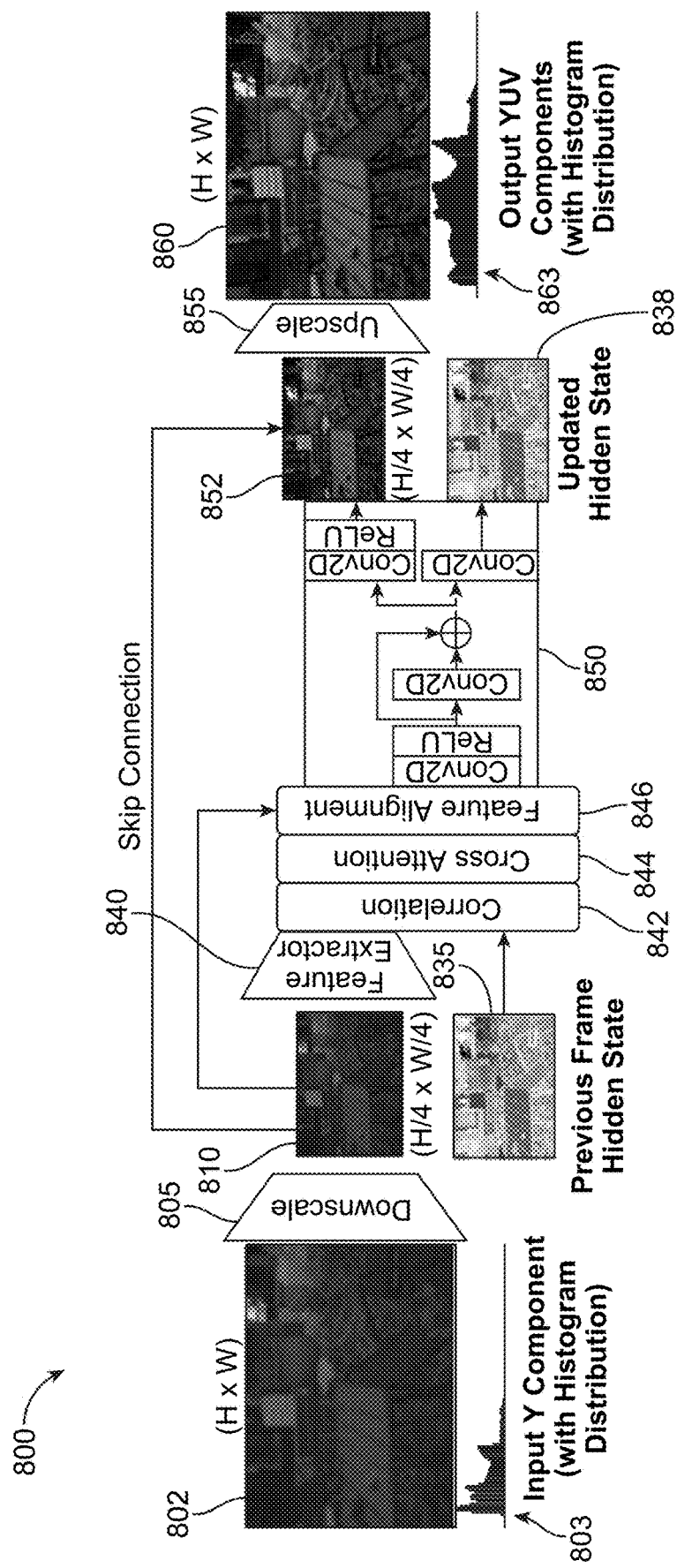
FIG. 8 is a diagram illustrating an example of a dependent frame image enhancement machine learning architecture, in accordance with some examples.

FIG. 8 is a diagram illustrating an example of a dependent frame image enhancement machine learning network 800, in accordance with some examples. In one illustrative example, the dependent frame image enhancement machine learning network 800 can be the same as or similar to the dependent frame enhancement network 460 of FIG. 4 and/or the RNN 940 of FIG. 9.

The dependent frame image enhancement machine learning network 800 (e.g., also referred to as the "dependent frame enhancement network" or the "dependent frame network") can receive as input the Y-plane luma component 802 of a low-light YUV image. The YUV image can be identified as a low-light image as described above, for example using the low-light detection engine 410 of FIG. 4, the low-light detection model 600 of FIG. 6, lux index values from the ISP node 490 of FIG. 4, etc. In one illustrative example, the systems and techniques The low-light YUV image processed by the dependent frame enhancement network 800 can be the same as or similar to the low-light YUV image classified as a dependent frame 434 by the frame type identification engine 430 of FIG. 4.

In some aspects, the Y-plane luma component 802 can be obtained based on splitting a low-light YUV image (identified as a dependent frame) into its respective Y-plane luma component, U-plane chroma component, and V-plane chroma component, in a manner the same as or similar to that described above with respect to splitting a YUV key frame image into the Y, U, V, components 702, 704, 706, respectively.

In one illustrative example, dependent frame image enhancement network 800 receives as input the Y-plane luma component 802 of the low-light dependent frame image but does not receive the U-plane or V-plane chroma components of the low-light dependent frame image. In some aspects, the dependent frame enhancement network 800 can receive the Y-plane luma component 802 and the previous frame hidden state 835, and can use the previous frame hidden state 835 to recover or otherwise generate accurate color information (e.g., chroma information) corresponding to the Y-plane luma component 802.

In some aspects, the dependent frame enhancement network 800 can receive as input the Y-plane luma component 802, the previous frame hidden state 835, and the histogram distribution 803 corresponding to the Y-plane luma component 802.

The previous frame hidden state 835 can be the same as the key frame hidden state 730 generated by the key frame enhancement network 700 of FIG. 7, in examples where the previous frame $F_{t-1}$ is a key frame. When the previous frame $F_{t-1}$ is a dependent frame, the previous frame hidden state 835 can be an updated hidden state 838 that is generated by the dependent frame enhancement network 800 when processing the previous dependent frame $F_{t-1}$, as will be described in greater depth below.

The Y-plane luma component 802 can have a pixel dimension of H×W (e.g., the same as the pixel dimension of the underlying YUV image identified as a dependent frame). A downscale engine 805 can be used to generate a downscaled version of the Y-plane luma component 802. For example, the Y-plane luma component 802 can be downscaled by a factor of four, where a downscaled Y-plane luma component 810 has a pixel dimension of H/4×W/4. In some aspects, the downscaled Y-plane luma component 810 can have 16 times fewer pixels than the original or full resolution Y-plane luma component 802.

The reduction in pixel quantity associated with downscale engine 805 (and the processing of only the luma component of the dependent frame image) can decrease the computational cost and complexity associated with generating the enhanced dependent frame image 860 using the dependent frame enhancement network 800. Additionally, the reduction in pixel quantity and the processing of only the luma component of the dependent frame image can decrease the inference time associated with generating the enhanced dependent frame image 860 using the dependent frame enhancement network 800. For example, the color components (e.g., chroma components U and V) of the dependent frame images can be skipped by the dependent frame enhancement network 800 for increased computational efficiency, and the previous frame hidden state features 835 can be used to generate accurate results with enhanced colors. Additionally, performing convolutions and/or convolutional operations on full dimension images (e.g., the original resolution Y-plane luma component 802) can be a computationally expensive or costly operation. Based on downscaling the input Y-plane luma component 802 to ¼ dimensions (e.g., the downscaled Y-plane luma component 810), the dependent frame network 800 can perform convolutions and/or convolutional operations with a lower computational cost.

In some aspects, the previous frame hidden state 835 (and the updated hidden state 838 generated for the current dependent frame) can have the same pixel dimensions as the downscaled Y-plane luma component 810. For instance, downscale engine 805 can perform downscaling to resize the full resolution Y-plane luma component 802 to match the pixel dimensions of the previous frame hidden state 835. The previous frame hidden state 835 can have pixel dimensions the same as the pixel dimensions of the U and V chroma components of the image. In examples where the image is a YUV 4:2:0 format image, the U and V chroma components have ½ the horizontal resolution and ½ the vertical resolution of the Y-plane luma component (and the YUV image itself, which has the same resolution as the Y-plane luma component). In such examples, the downscale engine 805 can downscale the full resolution dependent frame Y-plane component 802 by a factor of two, such that the downscaled Y-plane component 810 has the same dimensions as the previous frame hidden state 835 (e.g., H/2×W/2).

The downscaled luma components 810 can be provided as input to a feature extractor 840, which generates a plurality of features corresponding to the downscaled luma components 810 of the dependent frame image. One or more correlation layers 842 can receive as input the plurality of features from feature extractor 840 and the previous frame hidden state features 835. The correlation layers 842 can utilize the previous frame hidden state features 835 as a convolution kernel to perform a functional convolution operation. The functional convolution operation compares the Y-plane extracted features (e.g., generated by feature extractor 84) with the previous frame hidden state features 835 at each spatial location. The output of the one or more correlation layers 842 can be a correlation output tensor.

The correlation output tensor generated by the correlation layers 842 can be provided as input to a cross-attention unit 844. The cross attention unit 844 can include a convolutional+sigmoid activation, which utilizes the correlation output tensor(s) from correlation layers 842 as input and generates as output an attention map. In some aspects, cross attention unit 844 can generate the attention map to be indicative of a mapping between the Y-plane luma components of the dependent frame image and the U- and V-plane chroma components of the previous frame (e.g., based on the previous frame hidden state features 835).

The attention map from the cross attention unit 844 can be provided as input to a feature alignment unit 846. The feature alignment unit 846 can additionally receive as input the downscaled Y-plane luma components 810. The feature alignment unit 846 applies the attention map (e.g., from cross attention unit 844) to the features of the downscaled Y-plane luma component 810, while maintaining temporal consistency. In some aspects, feature alignment unit 846 can apply the attention map to the features generated by feature extractor 840 for the downscaled Y-plane luma component 810.

A warp engine 850 can include a plurality of convolutional layers (e.g., Conv2D) and one or more ReLu layers. The warp engine 850 can receive as input the output of feature alignment unit 846, and may be used to compensate for relative motion between the previous frame $F_t u$ (e.g., the frame associated with the previous frame hidden state 835) and the current frame $F_t$ (e.g., the low-light dependent frame image being processed by the dependent frame enhancement network 800). For instance, the warp engine 850 can be used to scale and update the previous frame hidden state 835 to correspond to the current frame (e.g., to correspond to the Y-frame luma component of the current dependent frame). In some aspects, the warped hidden state is the same as the updated hidden state 838 (e.g., the updated hidden state 838 can be generated by using warp engine 850 to warp the previous frame hidden state 835 based on the current dependent frame Y-plane luma component 810).

The downscaled Y-plane luma component 810 of the current low-light dependent frame can be warped with the chroma features of the updated hidden state 838, and used to generate a downscaled, enhanced image output 852. The downscaled enhanced image output 852 can have the same pixel dimensions as the downscaled Y-plane luma component 810, the previous frame hidden state 835, and the current frame updated hidden state 838.

In one illustrative example, the dependent frame enhancement network 800 can include an upscale engine 855. The upscale engine 855 can generate the enhanced image output 860 corresponding to the original resolution dependent frame (e.g., corresponding to the original resolution Y-plane luma component of the low-light dependent frame). For example, the upscale engine 855 can use an upscaling factor that is the same as the downscaling factor applied by the downscale engine 805. The enhanced image output 860 can have the same pixel dimensions (e.g., H×W) as the original resolution Y-plane luma component 802 (and therefore, the same pixel dimensions as the original resolution low-light dependent frame processed using the dependent frame enhancement network 800). A histogram distribution 863 corresponding to the enhanced image output 860 has a wider distribution (e.g., ranging to all pixel intensity regions) than the histogram distribution 803 corresponding to the input image 802 (e.g., which is a low-light image and has a distribution concentrated to the left, ranging to low intensity pixel regions only).

Figure 9:
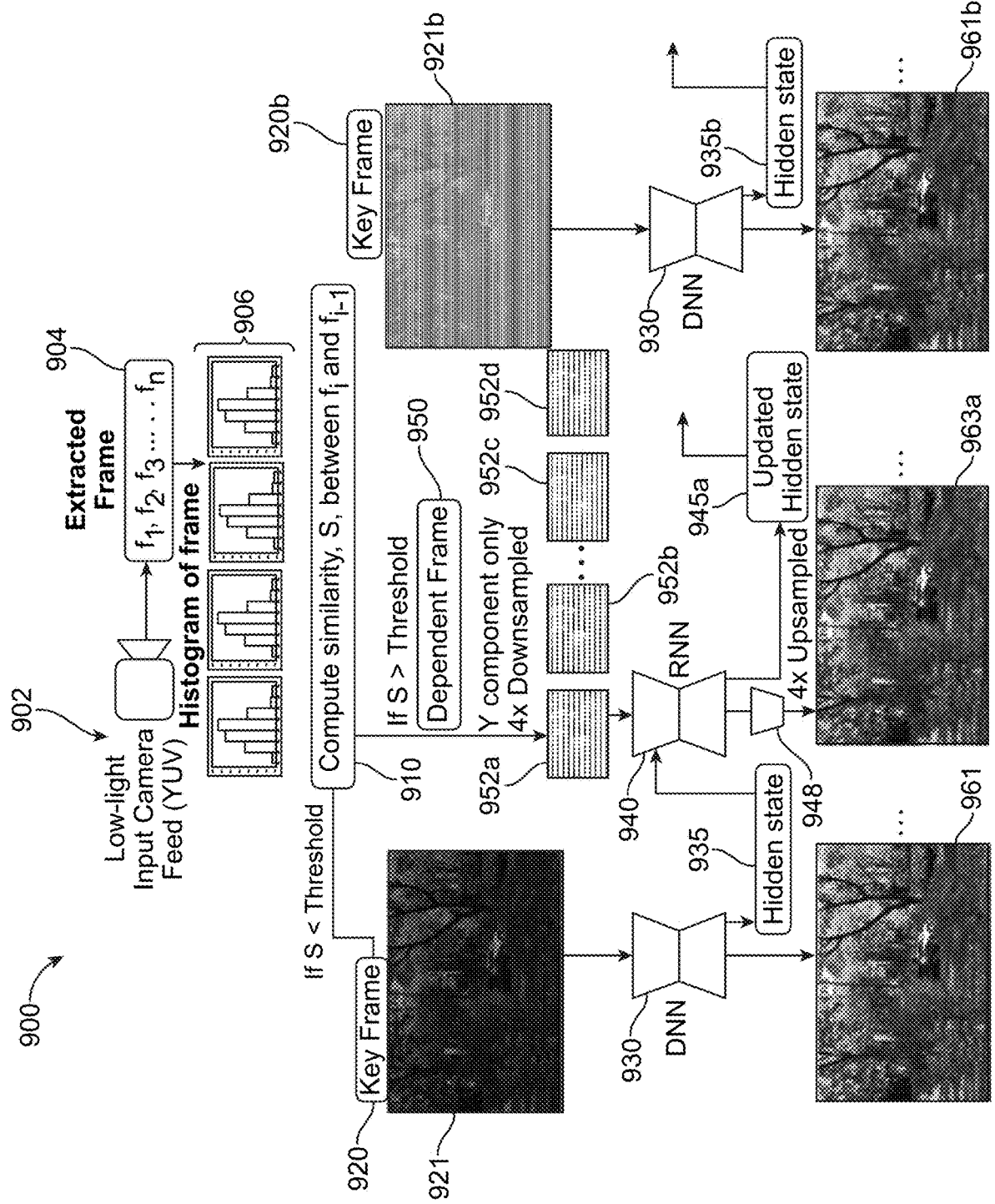
FIG. 9 is a diagram illustrating an example architecture of a low-light image enhancement machine learning model including a key frame image enhancement network and a dependent frame image enhancement network, in accordance with some examples.

FIG. 9 is a diagram illustrating an example architecture of a low-light image enhancement machine learning network 900, in accordance with some examples. The low-light image enhancement network 900 includes a DNN 930 that may be the same as or similar to the key frame image enhancement network 700 of FIG. 7. The low-light image enhancement network 900 further includes an RNN 940 that may be the same as or similar to the dependent frame image enhancement network 800 of FIG. 8.

A low-light input camera feed 902 can be provided to the low-light image enhancement network 900. The low-light input camera feed 902 can be associated with a plurality of images. Some (or all) of the plurality of images can be low-light images. The plurality of images can be provided in a YUV image format (e.g., YUV 4:2:0), among various other image formats.

The low-light input camera feed 902 (e.g., the plurality of images) can be provided to a frame extractor 904. The frame extractor 904 can be used to perform a low-light determination, in which each input frame of the plurality of images provided by low-light input camera feed 902 are identified as either a low-light frame or a non-low light frame. In one illustrative example, the frame extractor 904 can perform low-light identification for the extracted frames $F_1$, $F_2$, $F_3$, . . . , $F_n$ based on a corresponding plurality of histograms 906 associated with the extracted frames.

In one illustrative example, the frame extractor 904 can be the same as or similar to the low-light detection engine 410 of FIG. 4 and/or the low-light detection model 600 of FIG. 6. The plurality of histograms 906 can be similar to the example histograms of FIG. 5, and may be generated using the histogram generator 630 of FIG. 6. In some examples, the frame extractor 904 can be used to generate the selected subset of luma frames 620 from the plurality of images 610, as depicted in FIG. 6.

In some aspects, the frame extractor 904 can couple the input images in pairs and compare the histograms for each frame of the pair. For example, frame extractor 904 can compare the histogram 906 corresponding to the current frame $F_t$ to the histogram 906 corresponding to the previous frame $F_{t-1}$. From the generated histogram pair, the frame extractor 904 can determine whether the current frame is a low-light frame or a non-low-light frame, as described previously above.

Low-light frames (e.g., identified by frame extractor 904) can proceed to frame type identification 910, which determines a similarity, S, between the current frame $F_t$ and the previous frame $F_{t-1}$. In one illustrative example, the frame type identification engine 910 of FIG. 9 can be the same as or similar to the frame type identification engine 430 of FIG. 4. The frame type identification engine 910 can compare the similarity score S between the current frame and the previous frame to a threshold, and determine whether the current frame $F_t$ is a key frame or a dependent frame (e.g., as also described previously with respect to the frame type identification engine 430 of FIG. 4).

If the similarity score, S, is less than the threshold, the frame type identification engine 910 identifies the current frame $F_t$ as a key frame 920 (e.g., shown in FIG. 9 in combination with the underlying YUV image 921 associated with the identified key frame 920). If the similarity score, S, is not less than the threshold (e.g., is greater than the threshold; is greater than or equal to the threshold; etc.), the frame type identification engine 910 identifies the current frame $F_t$ as a dependent frame 950.

The YUV image 921 identified as a key frame 920 is provided as input to the key frame DNN 930, which generates as output an enhanced image 961 and a corresponding hidden state 935. The key frame DNN 930 can be the same as or similar to the key frame image enhancement network 700 of FIG. 7. The enhanced key frame image output 961 can be the same as or similar to the enhanced image output 750 of FIG. 7. The key frame hidden state 935 can be the same as or similar to the key frame hidden state 730 of FIG. 7. In some aspects, the low-light key frame 921 is enhanced based on a quantized DNN model used to implement the DNN 930. The key frame hidden state 935 can include enhanced luma and chrominance features that may be used to perform enhancement of low-light dependent frames (e.g., using the dependent frame RNN 940).

One or more dependent frames can be associated with the same key frame. For example, FIG. 9 depicts a first image 921 that is identified as a key frame 920. Subsequently, the next image (e.g., next in the sequence of images obtained from low-light input camera feed 902) is identified as a dependent frame 950, and a downscaled version of the luma component 952*a* is generated and provided to the dependent frame RNN 940. The downscaled version of the luma component 952*a* can be the same as or similar to the downscaled luma component 810 described above with respect to FIG. 8. The dependent frame RNN 940 can be the same as or similar to the dependent frame image enhancement network 800 of FIG. 8.

The dependent frame RNN 940 uses the downscaled dependent frame luma component 952*a* and the previous frame hidden state 935 (e.g., in this example, the previous frame hidden state 935 is the key frame hidden state associated with generating the enhanced key frame image output 961) as inputs to generate an enhanced image output for the low-light dependent frame. The output of dependent frame RNN 940 has the same downsampled resolution as the downscaled dependent frame luma component 952*a*, and can be provided to an upscaling engine 948. The upscaling engine 948 of FIG. 9 can be the same as or similar to the upscaling engine 855 of FIG. 8. The output of the upscaling engine 948 is a dependent frame enhanced image output 963*a*, corresponding to the input dependent frame 950/downscaled dependent frame luma component 952*a*.

An updated hidden state 945*a* of the dependent frame RNN 940 can be provided as input for potential use in the processing the next frame of the plurality of low-light frames obtained from low-light input camera feed 902. For example, if the next frame is also a dependent frame 950, then the updated hidden state determined for the current frame dependent frame 952*a* can be used (e.g., as the previous frame hidden state) to perform image enhancement for the next dependent frame 952*b*.

The process described above can be repeated for each additional dependent frame 950 that is identified for the same key frame 920 (e.g., each of the dependent frame images 952*a*, 952*b*, 952*c*, 952*d* are similar to and associated with the key frame image 921). The same dependent frame RNN 940 can be used to generate a corresponding enhanced image output for each of the plurality of dependent frame images (e.g., 952*a-d*).

In some examples, dependent frame RNN 940 generates the enhanced image output for first dependent frame 952*a* using the key frame hidden state 935 the previous frame hidden state 835 depicted in FIG. 8 and using the updated hidden state 945*a* of the RNN as the updated hidden state 838 of FIG. 8.

Dependent frame RNN 940 can generate the enhanced image output for second dependent frame 952*b* using the updated hidden state 945*a* of first dependent frame 952*a* as the previous frame hidden state 835 depicted in FIG. 8. The updated hidden state 945*b* of second dependent frame 952*b* can be used as the previous frame hidden state 835 for generating the enhanced image output for third dependent frame 952*c*. The updated hidden state 945*c* of third dependent frame 952*c* can be used as the previous frame hidden state 835 for generating the enhanced image output for fourth dependent frame 952*d*.

When a new key frame is identified after one or more previous dependent frames, a new hidden state is calculated. For instance, dependent frames 952*a-d* are processed by the dependent frame RNN 940 based on successively or iteratively updating an initial hidden state provided as the key frame hidden state 935 corresponding to the key frame image 921. When a later low-light image 921*b* is identified as a new (e.g., second) key frame 920*b*, the key frame DNN 930 generates an entirely new hidden state 935*b* based on processing the Y, U, and V components of the new key frame image 921*b* (e.g., as described with respect to key frame image enhancement network 700 of FIG. 7). For example, the new key frame hidden state 935*b* can be generated without reference to (e.g., independently from) either the prior key frame hidden state 935 or any of the intervening updated dependent frame hidden states 945*a-d*.

In one illustrative example, the dependent frame image enhancement described herein can be performed in a shorter inference time than the key frame image enhancement described herein. For instance, the key frame enhancement DNN 930 may be associated with an inference time of approximately 19 milliseconds (ms) for generating the enhanced output image 961 corresponding to the low-light key frame image 921. The dependent frame enhancement RNN 940 may be associated with an inference time of approximately 10 milliseconds (ms) for generating the enhanced output image 963*a* corresponding to the low-light dependent frame image 952*a*.

Figure 10:
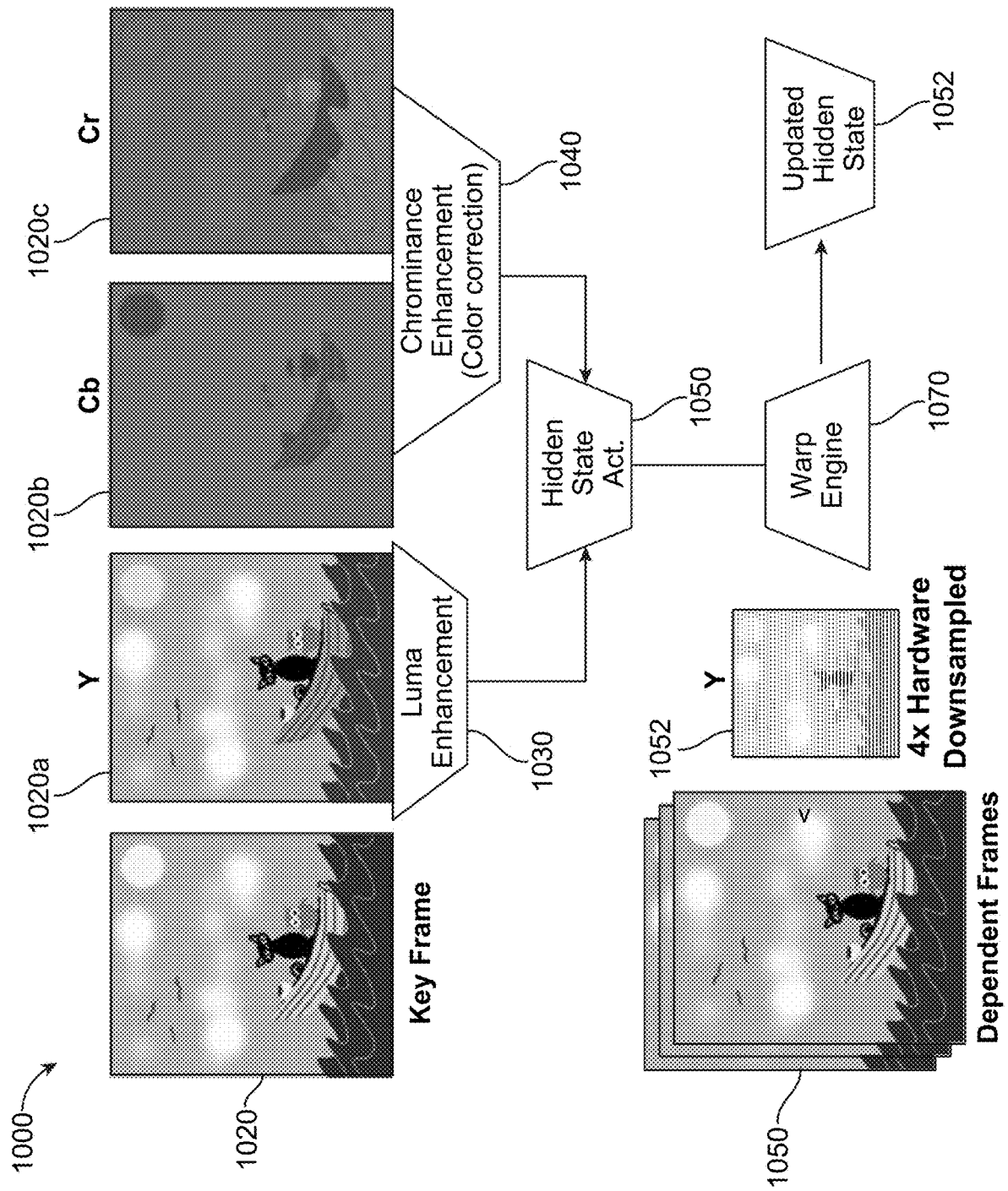
FIG. 10 is a diagram illustrating an example architecture of a low-light image enhancement machine learning model, in accordance with some examples.

FIG. 10 is a diagram illustrating an example architecture of a low-light image enhancement machine learning model 1000, in accordance with some examples. A key frame image 1020 can be associated with or include a luma component (Y-plane) 1020*a*, a blue color-difference chroma component (Cb) 1020*b*, and a red color-difference chroma component (Cr) 1020*c*. In some aspects, the key frame image 1020 can be split to generate the Y component 1020*a*, the Cb component 1020*b*, and the Cr component 1020*c*.

The Y-plane luma component 1020*a* can be provided as input to a luma enhancement engine 1030 and the two chroma components 1020*b*, 1020*c* can be provided as input to a chroma enhancement engine 1040. In some aspects, the luma enhancement engine 1030 can be the same as or similar to the luma enhancement sub-network described above as being included in the key frame image enhancement machine learning network 700 of FIG. 7. In some cases, the chroma enhancement engine 1040 can be the same as or similar to the ChromaNet 720 described above with respect to the key frame image enhancement machine learning network 700 of FIG. 7.

A luma-enhanced output (e.g., associated with luma enhancement 1030) can be combined with a chroma-enhanced output (e.g., associated with chroma enhancement 1040) in a hidden activation state 1050. The hidden activation state 1050 can comprise a final activation layer from the one or more convolutions associated with implementing the luma enhancement 1030 and the chroma enhancement 1040. For instance, the hidden activation state 1050 can comprise a final activation layer from the key frame image enhancement network 700 of FIG. 7. In some aspects, the hidden activation state 1050 can be the same as or similar to the luma-enhanced internal or hidden state that is fused with the ChromaNet 720 output as described above with respect to key frame enhancement network 700 of FIG. 7. For instance, the hidden activation state 1050 can comprise a concatenation of the luma-enhanced internal state and the ChromaNet 720 output of FIG. 7.

Image enhancement can be performed for one or more (e.g., a plurality of) dependent images 1050. As described previously above, each dependent image of the dependent images 1050 can be downscaled. For example, a 4× hardware downsampled image 1052 can be generated for each dependent image of the dependent images 1050. Various other downsampling or downscaling factors besides 4× may also be utilized. The downsampled image 1052 can be generated based on downsampling only the luma (e.g., Y-plane) components of each dependent image of the dependent images 1050. The downsampled dependent image frame luma 1052 can be warped with the hidden activation state 1050, using a warp engine 1070. The warp engine 1070 may be the same as or similar to the warp engine 850 described above with respect to the dependent frame image enhancement machine learning network 800 of FIG. 8. The warp engine 1070 can generate an updated hidden state 1052 that is the same as or similar to the updated hidden state 838 of FIG. 8 and/or the updated hidden state 945*a* of FIG. 9.

FIG. 11 is a flowchart illustrating an example process 1100 for processing image data. The process 1100 can be performed by a computing device (or apparatus), or a component of the computing device (e.g., a chipset, a processor such as a neural processing unit (NPU), a digital signal processor (DSP), etc.), utilizing or implementing one or more of the neural network and/or machine learning models described herein.

At block 1102, the process 1100 can include classifying a first image as a key frame, based on a difference between the first image and a previous image, wherein the first image and the previous image are included in a plurality of images. For example, the plurality of images can be the same as or similar to the plurality of images 610 of FIG. 6. The plurality of images can be still images (e.g., standalone images) and/or can be video frames (e.g., frames of video data). In some cases, the first image can be the same as or similar to one or more of the key frame images 921, 921*b* of FIG. 9; the key frame image 1020 of FIG. 10. When the first image is the key frame image 921*b* of FIG. 10, the previous image can be the image 952*d* of FIG. 10.

In some examples, the first image is a low-light image. For example, a respective luminance associated with the first image can be less than a low-light threshold. In some examples, each respective image of the plurality of images can be classified as a low-light image or a non-low-light image based on a lux index associated with each respective image. The lux index can be obtained from an ISP or ISP node, such as the ISP node 490 of FIG. 4.

In some examples, a frame identification neural network can be used to classify each low-light image of the plurality of images as a key frame or a dependent frame. For instance, the frame identification neural network can be the same as or similar to the frame type identification network 430 of FIG. 4.

In some cases, a low-light detection engine can be used to classify each respective image of the plurality of images as a low-light image or a non-low-light image (and the frame identification neural network can be used to classify each low-light image of the plurality of images as a key frame or a dependent frame). For example, the low-light detection engine can be the same as or similar to the low-light detection engine 410 of FIG. 4 and/or the low-light detection model 600 of FIG. 6. In some cases, each respective image can be classified using the low-light detection engine based on generating a first luminance histogram for the respective image and a second luminance histogram for a previous image, wherein the previous image and the respective image are consecutive images in the plurality of images. For example, the luminance histograms can be the same as or similar to the histograms 630 generated by the low-light detection model 600 of FIG. 6. A binary classification can be determined for the respective image, based on the first luminance histogram and the second luminance histogram. For instance, the binary classification can classify the respective image as a low-light image or a non-low-light image, and may use the sigmoid 650 of FIG. 6.

At block 1104, the process 1100 can include generating, using a first machine learning network, an enhanced key frame image corresponding to the first image and a hidden state output associated with the enhanced key frame image. For example, the first machine learning network can be a deep neural network (DNN). The first machine learning network can be the same as or similar to the key frame enhancement network 440 of FIG. 4, the key frame enhancement network 700 of FIG. 7, and/or the DNN 930 of FIG. 9. In some cases, the first machine learning network includes a luminance enhancement sub-network and a chrominance enhancement sub-0network. For instance, the luminance enhancement sub-network can be the same as or similar to the luminance enhancement sub-network of the key frame enhancement network 700 of FIG. 7 and the chrominance enhancement sub-network can be the same as or similar to the ChromaNet 720 of FIG. 7.

The enhanced key frame image can be the same as or similar to the enhanced image output 750 of FIG. 7 and/or the enhanced image outputs 961, 961*b* of FIG. 9. The hidden state output can be the same as or similar to the hidden state 730 of FIG. 7, and/or the hidden states 935, 935*b* of FIG. 9, and/or the hidden state 1052 of FIG. 10. In some cases, the hidden state output associated with the enhanced key frame includes enhanced luminance features associated with the enhanced key frame image, the enhanced luminance features generated using the luminance enhancement sub-network, and enhanced chrominance features associated with the enhanced key frame image, the enhanced chrominance features generated using the chrominance enhancement sub-network. In some aspects, the luminance enhancement sub-network can be the same as or similar to the luma enhancement network 1030 of FIG. 10 and the enhanced luminance features can be the same as or similar to the enhanced luminance features 1020*a* of FIG. 10. The chrominance enhancement sub-network can be the same as or similar to the color correction chrominance enhancement network 1040 of FIG. 10, and the enhanced chrominance features can be the same as or similar to the enhanced chrominance features 1020*b*, 1020*c* of FIG. 10.

In some examples, to generate the hidden state output associated with the enhanced key frame image, the chrominance enhancement sub-network (e.g., ChromaNet 720 of FIG. 7) can be used to generate enhanced chrominance features associated with chrominance information of the first image. The chrominance information can be the same as or similar to the U component 704 and the V component 706 of FIG. 7 and/or can be the same as or similar to the chrominance information 1020*b*, 1020*c* of FIG. 10. The enhanced chrominance features can be fused with an internal hidden state of the luminance enhancement sub-network (e.g., the luminance enhancement sub-network of FIG. 7 and/or the luma enhancement network 1030 of FIG. 10). The internal hidden state can be different from the hidden state output. For instance, the internal state can be the same as or similar to the internal hidden state at the fusion concatenation 768 between the ChromaNet 720 and luminance enhancement sub-network of FIG. 7.

At block 1106, the process 1100 can include classifying a second image of the plurality of images as a dependent frame, based on a similarity between the second image and the first image. For example, the second image can be the same as or similar to one or more of the dependent frame images 952*a*, 952*b*, 952*c*, 952*d*, 921*b* of FIG. 9 and/or the dependent frame images 1050 of FIG. 10. In some cases, the second image can be the same as or similar to the dependent frame image 950 determined based on the similarity computation 910 of FIG. 9.

In some examples, the first image and the second image are low-light images. For example, a respective luminance associated with the first image can be less than a low-light threshold and a respective luminance associated with the second image can be less than the low-light threshold. In some examples, each respective image of the plurality of images can be classified as a low-light image or a non-low-light image based on a lux index associated with each respective image. The lux index can be obtained from an ISP or ISP node, such as the ISP node 490 of FIG. 4. In some examples, the same frame identification neural network can be used to classify each low-light image of the plurality of images as a key frame or a dependent frame. For instance, the frame identification neural network can be the same as or similar to the frame type identification network 430 of FIG. 4.

In some cases, a low-light detection engine can be used to classify each respective image of the plurality of images as a low-light image or a non-low-light image (and the frame identification neural network can be used to classify each low-light image of the plurality of images as a key frame or a dependent frame). For example, the low-light detection engine can be the same as or similar to the low-light detection engine 410 of FIG. 4 and/or the low-light detection model 600 of FIG. 6. In some cases, each respective image can be classified using the low-light detection engine based on generating a first luminance histogram for the respective image and a second luminance histogram for a previous image, wherein the previous image and the respective image are consecutive images in the plurality of images. For example, the luminance histograms can be the same as or similar to the histograms 630 generated by the low-light detection model 600 of FIG. 6. A binary classification can be determined for the respective image, based on the first luminance histogram and the second luminance histogram. For instance, the binary classification can classify the respective image as a low-light image or a non-low-light image, and may use the sigmoid 650 of FIG. 6.

In some examples, the first image can be classified as a key frame based on a first motion information between the first image and the previous image. For instance, the first image can be classified as a key frame 920 based on a first motion information between the first image and the previous image, as determined by the similarity computation 910 of FIG. 9. The second image can be classified as a dependent frame based on a second motion information between the second image and the first image. For instance, when the second image is the dependent frame 950, 952*a* of FIG. 9, the second image can be classified as a dependent frame 950 based on the second motion information between the second image and the first key frame image (e.g., 920, 921 of FIG. 9). The second motion information can be determined by the similarity computation 910 of FIG. 9. In some cases, the frame type identification engine 430 of FIG. 4 can be used to classify the first image as a key frame based on the first motion information and to classify the second image as a dependent frame based on the second motion information.

In some examples, the first motion information comprises a first perceptual similarity index value determined using a frame identification neural network (e.g., such as the frame type identification network 430 of FIG. 4), wherein the first motion information is indicative of the difference between the first image and the previous image based on the first perceptual similarity index value being less than a threshold (e.g., such as the difference between the perceptual similarity index value S and the threshold depicted in FIG. 9 as associated with the similarity computation 910). The second motion information can comprise a second perceptual similarity index value determined using the frame identification neural network (e.g., the frame type identification network 430 of FIG. 4), wherein the second motion information is indicative of the similarity between the second image and the first image based on the second perceptual similarity index value being greater than the threshold.

At block 1108, the process 1100 can include generating, using a second machine learning network, an enhanced dependent frame image corresponding to the second image, wherein the enhanced dependent frame image is based on the second image and the hidden state output associated with the enhanced key frame image. The first machine learning network can be different from the second machine learning network. For example, the second machine learning network can be a recurrent neural network (RNN). In some cases, the second machine learning network can be the same as or similar to the dependent frame enhancement network 460 of FIG. 4, the dependent frame enhancement network 800 of FIG. 8, and/or the RNN 940 of FIG. 9. In some cases, a luminance information provided as input to the second machine learning network has a resolution less than or equal to one half of a resolution of luminance information provided as input to the first machine learning network. For instance, the luminance information provided as input to the second machine learning network can be the same as or similar to the luminance information 810 of FIG. 8, which may be 4× downscaled from the original input image 802. The luminance information provided as input to the first machine learning network can be the same as or similar to the luminance information 702 of FIG. 7, which can have the same resolution as the input image to the first machine learning network. In another example, the luminance information provided as input to the second machine learning network is the same as or similar to the 4× downsampled luminance information 952*a*-*d* of FIG. 9, which is one fourth the resolution of the luminance information 921 provided as input to the first machine learning. In another example, the luminance information provided as input to the second machine learning network is the same as or similar to the 4× downsampled luminance information 1052 of FIG. 10, which has a resolution that is one fourth the resolution of the luminance information 1020 provided as input to the first machine learning network. In some aspects, a resolution of the first image is the same as a resolution of the second image, and each image of the plurality of images has the resolution.

In some cases, the second machine learning network can be used to generate an updated hidden state output associated with the enhanced dependent frame image. For example, the updated hidden state output associated with the enhanced dependent frame image can be the same as or similar to the updated hidden state output 838 of FIG. 8. The enhanced dependent frame image can be the same as or similar to the enhanced dependent frame image 860 of FIG. 8 and/or the enhanced dependent frame image 963*a* of FIG. 9. The updated hidden state output can be generated by warping chrominance information of the second image with the hidden state output associated with the enhanced key frame image. For instance, the chrominance information of the second image can be warped with the hidden state output associated with the previous frame (e.g., the same as or similar to the previous frame hidden state 835 of FIG. 8). In another example, the chrominance information of the second image can be warped with the previous frame hidden state 935 of FIG. 9, in the example where the second image is the dependent frame image 952*a* and the first image is the key frame image 921.

In some examples, a third image of the plurality of images can be classified as a dependent frame, based on a similarity between the third image and the second image. For instance, the similarity can be determined based on the similarity computation 910 of FIG. 9, and the third image can be classified as a dependent frame based on the similarity between the second and third images being greater than the threshold. In some cases, the second machine learning network can generate an enhanced dependent frame image corresponding to the third image, based on the third image and the updated hidden state output. The enhanced dependent frame image can be the same as or similar to the enhanced dependent frame image 963*a* of FIG. 9 and/or the enhanced dependent frame image 860 of FIG. 8.

In some cases, the first machine learning network can be provided with respective luminance information, respective first chrominance information, and respective second chrominance information corresponding to a key frame image. For instance, the key frame enhancement network 700 of FIG. 7 can be provided with the luminance information 702, first chrominance information 704, and second chrominance information 706. The second machine learning network can be provided with luminance information corresponding to a dependent frame image. For instance, the dependent frame enhancement network 800 of FIG. 8 can be provided with the luminance information 802. To generate the enhanced dependent frame image, the luminance information corresponding to the dependent frame image can be downscaled. For instance, to generate the enhanced dependent frame image 860 of FIG. 8, the luminance information 802 can be downscaled using a downscale engine 805 as depicted in FIG. 8. The downscaled luminance information can be the same as or similar to the downscaled luminance information 810 of FIG. 8. For instance, the downscaled luminance information can be 4× downscaled by the downscale engine 805. The downscaled luminance information can have a resolution that is the same as a resolution of the hidden state output associated with the enhanced key frame image. For example, the resolution of the downscaled luminance information 810 of FIG. 8 can be the same as the resolution of the previous frame hidden state 835 of FIG. 8 (e.g., which may itself be the same as the hidden state 730 of FIG. 7).

In some cases, a convolution layer of the second machine learning network can be used to generate a correlation output tensor indicative of correlation information between the downscaled luminance information and the hidden state output associated with the enhanced key frame image. The convolution layer can be the same as or similar to the convolution layer(s) used to implement the correlation 842 of FIG. 8. The correlation output tensor indicative of the correlation information can be generated as output by the correlation engine 842 of FIG. 8.

A cross-attention layer of the second machine learning network can be used to determine an attention map based on the correlation output tensor. For instance, the cross-attention layer 844 of FIG. 8 can be used to determine the attention map based on the correlation output tensor. A feature alignment can be determined between features of the downscaled luminance information (e.g., such as features generated using the feature extractor 840 of FIG. 8) and the hidden state output, the feature alignment based on the attention map. In some cases, the second machine learning network can be used to generate an updated hidden state output associated with the enhanced dependent frame image, based on warping the feature alignment with the hidden state output associated with the enhanced key frame image. For instance, the updated hidden state output associated with the enhanced dependent frame image can be the same as or similar to the updated hidden state output 838 of FIG. 8.

As noted above, the processes described herein (e.g., process 1100 and/or any other process described herein) may be performed by a computing device or apparatus utilizing or implementing machine learning and/or neural network model (e.g., including one or more of the cascaded model pipeline 410 of FIG. 4, the low-light detection model 600 of FIG. 6, the key frame image enhancement model 700 of FIG. 7, the dependent frame image enhancement model 800 of FIG. 8, the low-light image enhancement model 900 of FIG. 9, and/or the low-light image enhancement model 1000 of FIG. 10).

In one example, the process 1100 can be performed by the electronic device 100 of FIG. 1A. In another example, the process 1100 can be performed by the image capture and processing system 100*b* of FIG. 1B. In another example, the process 1100 can be performed by the computing system having the computing device architecture of the computing system 1400 shown in FIG. 14. For instance, a computing device with the computing device architecture of the computing system 1400 shown in FIG. 14 can implement the operations of FIG. 11 and/or the components and/or operations described herein with respect to any of FIGS. 4 through 11.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, a drone or unmanned aerial vehicle (UAV), and/or any other computing device with the resource capabilities to perform the processes described herein, including the process 1100 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1100 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
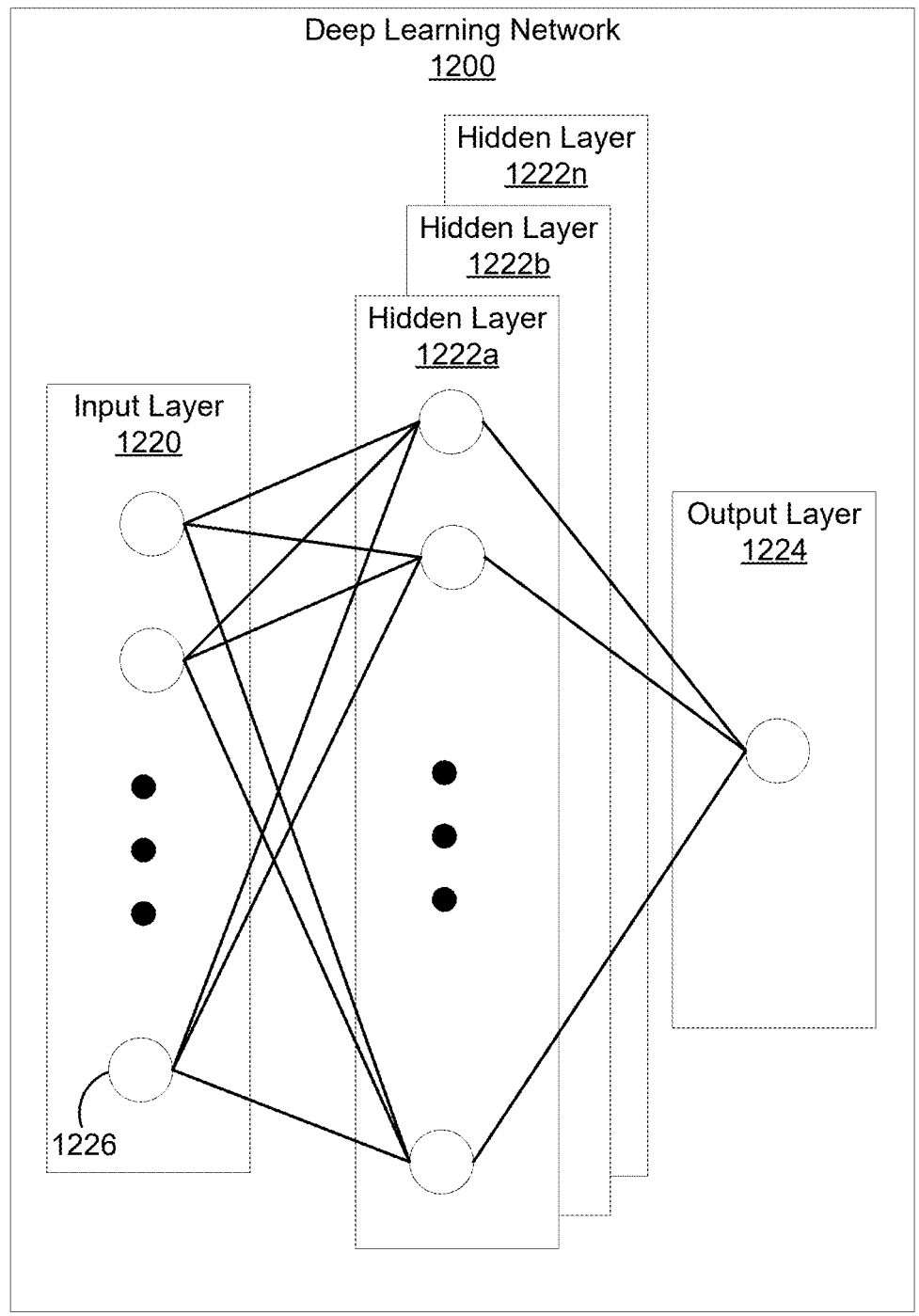
FIG. 12 is a block diagram illustrating an example of a deep learning network, in accordance with some examples.

FIG. 12 is an illustrative example of a deep learning neural network 1200 that can be used by one or more of the machine learning and/or neural network models, systems, and/or architectures described herein. An input layer 1220 includes input data. In one illustrative example, the input layer 1220 can include data representing the pixels of an input video frame. The neural network 1200 includes multiple hidden layers 1222*a*, 1222*b*, through 1222*n*. The hidden layers 1222*a*, 1222*b*, through 1222*n* include "n" number of hidden layers, where "n" is an integer greater than or equal to one. The number of hidden layers can be made to include as many layers as needed for the given application. The neural network 1200 further includes an output layer 1224 that provides an output resulting from the processing performed by the hidden layers 1222*a*, 1222*b*, through 1222*n*. In one illustrative example, the output layer 1224 can provide a classification for an object in an input video frame. The classification can include a class identifying the type of object (e.g., a person, a dog, a cat, or other object).

The neural network 1200 is a multi-layer neural network of interconnected nodes. Each node can represent a piece of information. Information associated with the nodes is shared among the different layers and each layer retains information as information is processed. In some cases, the neural network 1200 can include a feed-forward network, in which case there are no feedback connections where outputs of the network are fed back into itself. In some cases, the neural network 1200 can include a recurrent neural network, which can have loops that allow information to be carried across nodes while reading in input.

Information can be exchanged between nodes through node-to-node interconnections between the various layers. Nodes of the input layer 1220 can activate a set of nodes in the first hidden layer 1222*a*. For example, as shown, each of the input nodes of the input layer 1220 is connected to each of the nodes of the first hidden layer 1222*a*. The nodes of the hidden layers 1222*a*, 1222*b*, through 1222*n* can transform the information of each input node by applying activation functions to the information. The information derived from the transformation can then be passed to and can activate the nodes of the next hidden layer 1222*b*, which can perform their own designated functions. Example functions include convolutional, up-sampling, data transformation, and/or any other suitable functions. The output of the hidden layer 1222*b* can then activate nodes of the next hidden layer, and so on. The output of the last hidden layer 1222*n* can activate one or more nodes of the output layer 1224, at which an output is provided. In some cases, while nodes (e.g., node 1226) in the neural network 1200 are shown as having multiple output lines, a node has a single output and all lines shown as being output from a node represent the same output value.

In some cases, each node or interconnection between nodes can have a weight that is a set of parameters derived from the training of the neural network 1200. Once the neural network 1200 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1200 to be adaptive to inputs and able to learn as more and more data is processed.

The neural network 1200 is pre-trained to process the features from the data in the input layer 1220 using the different hidden layers 1222*a*, 1222*b*, through 1222*n* in order to provide the output through the output layer 1224. In an example in which the neural network 1200 is used to identify objects in images, the neural network 1200 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1200 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1200 is trained well enough so that the weights of the layers are accurately tuned.

For the example of identifying objects in images, the forward pass can include passing a training image through the neural network 1200. The weights are initially randomized before the neural network 1200 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1200, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1200 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined $$E_{total} = \sum \frac{1}{2}(\text{target} - \text{output})^2,$$

which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1200 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1200 can include any suitable deep network. One example includes a convolutional neural network (CNN), which includes an input layer and an output layer, with multiple hidden layers between the input and out layers. An example of a CNN is described below with respect to FIG. 13. The hidden layers of a CNN include a series of convolutional, nonlinear, pooling (for downsampling), and fully connected layers. The neural network 1200 can include any other deep network other than a CNN, such as an autoencoder, a deep belief nets (DBNs), a Recurrent Neural Networks (RNNs), among others.

Figure 13:
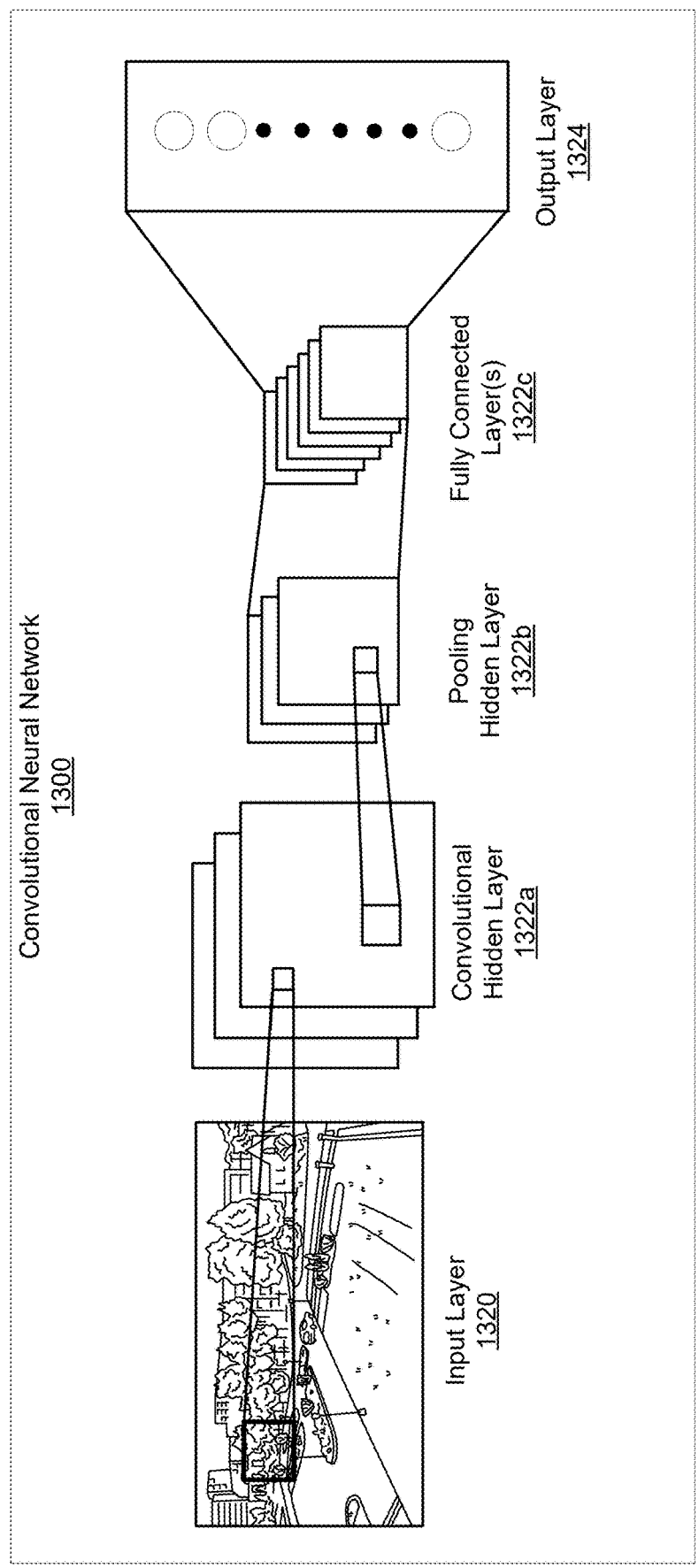
FIG. 13 is a block diagram illustrating an example of a convolutional neural network, in accordance with some examples.

FIG. 13 is an illustrative example of a convolutional neural network 1300 (CNN 1300). The input layer 1320 of the CNN 1300 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1322a, an optional non-linear activation layer, a pooling hidden layer 1322b, and fully connected hidden layers 1322c to get an output at the output layer 1324. While only one of each hidden layer is shown in FIG. 13, one of ordinary skill will appreciate that multiple convolutional hidden layers, non-linear layers, pooling hidden layers, and/or fully connected layers can be included in the CNN 1300. As previously described, the output can indicate a single class of an object or can include a probability of classes that best describe the object in the image.

The first layer of the CNN 1300 is the convolutional hidden layer 1322a. The convolutional hidden layer 1322a analyzes the image data of the input layer 1320. Each node of the convolutional hidden layer 1322a is connected to a region of nodes (pixels) of the input image called a receptive field. The convolutional hidden layer 1322a can be considered as one or more filters (each filter corresponding to a different activation or feature map), with each convolutional iteration of a filter being a node or neuron of the convolutional hidden layer 1322a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1322a. Each connection between a node and a receptive field for that node learns a weight and, in some cases, an overall bias such that each node learns to analyze its particular local receptive field in the input image. Each node of the hidden layer 1322a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1322a is due to each node of the convolutional layer being applied to its corresponding receptive field. For example, a filter of the convolutional hidden layer 1322a can begin in the top-left corner of the input image array and can convolve around the input image. As noted above, each convolutional iteration of the filter can be considered a node or neuron of the convolutional hidden layer 1322a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1322a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1322a.

The mapping from the input layer to the convolutional hidden layer 1322a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1322a can include several activation maps in order to identify multiple features in an image. The example shown in FIG. 13 includes three activation maps. Using three activation maps, the convolutional hidden layer 1322a can detect three different kinds of features, with each feature being detectable across the entire image.

In some examples, a non-linear hidden layer can be applied after the convolutional hidden layer 1322a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1300 without affecting the receptive fields of the convolutional hidden layer 1322a.

The pooling hidden layer 1322b can be applied after the convolutional hidden layer 1322a (and after the non-linear hidden layer when used). The pooling hidden layer 1322b is used to simplify the information in the output from the convolutional hidden layer 1322a. For example, the pooling hidden layer 1322b can take each activation map output from the convolutional hidden layer 1322a and generates a condensed activation map (or feature map) using a pooling function. Max-pooling is one example of a function performed by a pooling hidden layer. Other forms of pooling functions be used by the pooling hidden layer 1322a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1322a. In the example shown in FIG. 13, three pooling filters are used for the three activation maps in the convolutional hidden layer 1322a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1322a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1322a having a dimension of 24×24 nodes, the output from the pooling hidden layer 1322b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1300.

The final layer of connections in the network is a fully-connected layer that connects every node from the pooling hidden layer 1322b to every one of the output nodes in the output layer 1324. Using the example above, the input layer includes 28×28 nodes encoding the pixel intensities of the input image, the convolutional hidden layer 1322a includes 3×24×24 hidden feature nodes based on application of a 5×5 local receptive field (for the filters) to three activation maps, and the pooling layer 1322b includes a layer of 3×12×12 hidden feature nodes based on application of max-pooling filter to 2×2 regions across each of the three feature maps. Extending this example, the output layer 1324 can include ten output nodes. In such an example, every node of the 3×12×12 pooling hidden layer 1322b is connected to every node of the output layer 1324.

The fully connected layer 1322c can obtain the output of the previous pooling layer 1322b (which should represent the activation maps of high-level features) and determines the features that most correlate to a particular class. For example, the fully connected layer 1322c layer can determine the high-level features that most strongly correlate to a particular class, and can include weights (nodes) for the high-level features. A product can be computed between the weights of the fully connected layer 1322c and the pooling hidden layer 1322b to obtain probabilities for the different classes. For example, if the CNN 1300 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1324 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 14:
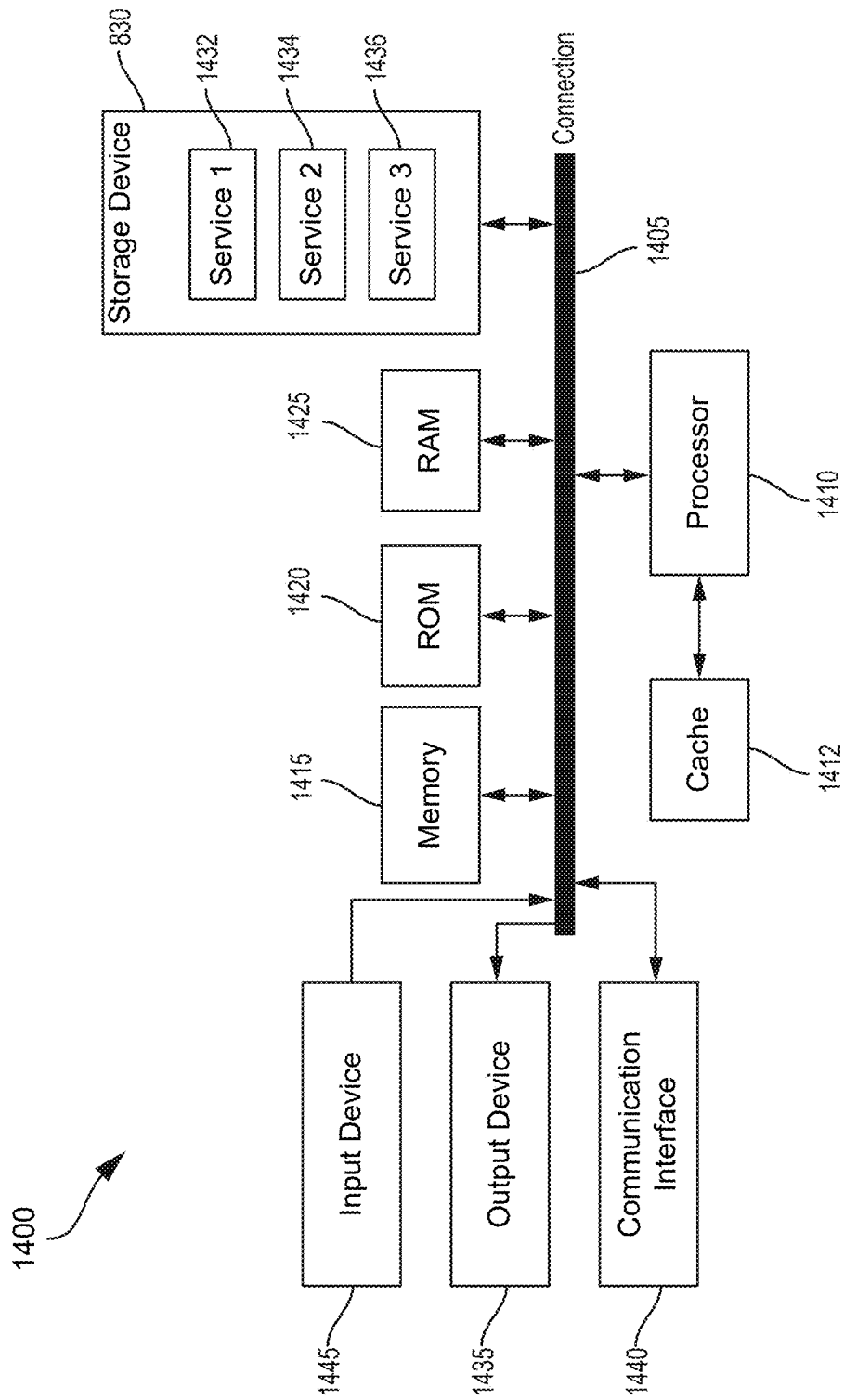
FIG. 14 is a diagram illustrating an example system architecture for implementing certain aspects described herein.

FIG. 14 is a diagram illustrating an example of a system for implementing certain aspects of the present disclosure. In particular, FIG. 14 illustrates an example of computing system 1400, which can be for example any computing device making up a computing system, a camera system, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some examples, computing system 1400 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some examples, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects and examples in unnecessary detail. In other instances, well-known circuits, processes, algorithms, structures, and techniques may be shown without unnecessary detail in order to avoid obscuring the aspects and examples.

Individual aspects and examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative aspects and examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for processing image data, the apparatus comprising: at least one memory; and at least one processor coupled to the at least one memory, the at least one processor being configured to: classify a first image as a key frame, based on a difference between the first image and a previous image, wherein the first image and the previous image are included in a plurality of images; generate, using a first machine learning network, an enhanced key frame image corresponding to the first image and a hidden state output associated with the enhanced key frame image; classify a second image of the plurality of images as a dependent frame, based on a similarity between the second image and the first image; and generate, using a second machine learning network, an enhanced dependent frame image corresponding to the second image, wherein the enhanced dependent frame image is based on the second image and the hidden state output associated with the enhanced key frame image.

Aspect 2. The apparatus of Aspect 1, wherein at least one processor is further configured to: generate, using the second machine learning network, an updated hidden state output associated with the enhanced dependent frame image.

Aspect 3. The apparatus of Aspect 2, wherein, to generate the updated hidden state output, the at least one processor is configured to: warp chrominance information of the second image with the hidden state output associated with the enhanced key frame image.

Aspect 4. The apparatus of any of Aspects 2 to 3, wherein the at least one processor is further configured to: classify a third image of the plurality of images as a dependent frame, based on a similarity between the third image and the second image; and generate, using the second machine learning network, an enhanced dependent frame image corresponding to the third image, wherein the enhanced dependent frame image corresponding to the third image is based on the third image and the updated hidden state output.

Aspect 5. The apparatus of any of Aspects 1 to 4, wherein the first image and the second image are low-light images, and wherein a respective luminance associated with the first image and the second image is less than a low-light threshold.

Aspect 6. The apparatus of any of Aspects 1 to 5, wherein the at least one processor is further configured to: classify, using a low-light detection engine, each respective image of the plurality of images as a low-light image or a non-low-light image; and classify, using a frame identification neural network, each low-light image of the plurality of images as a key frame or a dependent frame.

Aspect 7. The apparatus of Aspect 6, wherein, to classify each respective image using the low-light detection engine, the at least one processor is configured to: generate a first luminance histogram for the respective image and a second luminance histogram for a previous image, wherein the previous image and the respective image are consecutive images in the plurality of images; and determine a binary classification for the respective image, the binary classification based on the first luminance histogram and the second luminance histogram.

Aspect 8. The apparatus of any of Aspects 1 to 7, wherein the first machine learning network is different from the second machine learning network.

Aspect 9. The apparatus of any of Aspects 1 to 8, wherein the first machine learning network is a deep neural network (DNN), and wherein the first machine learning network includes: a luminance enhancement sub-network; and a chrominance enhancement sub-network; and Aspect 10. The apparatus of Aspect 9, wherein the hidden state output associated with the enhanced key frame image includes: enhanced luminance features associated with the enhanced key frame image, the enhanced luminance features generated using the luminance enhancement sub-network; and enhanced chrominance features associated with the enhanced key frame image, the enhanced chrominance features generated using the chrominance enhancement sub-network.

Aspect 11. The apparatus of any of Aspects 9 to 10, wherein, to generate the hidden state output associated with the enhanced key frame image, the at least one processor is configured to: generate, using the chrominance enhancement sub-network, enhanced chrominance features associated with chrominance information of the first image; and fuse the enhanced chrominance features with an internal hidden state of the luminance enhancement sub-network, wherein the internal hidden state is different from the hidden state output.

Aspect 12. The apparatus of any of Aspects 1 to 11, wherein: the second machine learning network is a recurrent neural network (RNN); and a luminance information provided as input to the second machine learning network has a resolution less than or equal to one half of a resolution of luminance information provided as input to the first machine learning network.

Aspect 13. The apparatus of Aspect 12, wherein: a resolution of the first image is the same as a resolution of the second image; and each image of the plurality of images has the resolution.

Aspect 14. The apparatus of any of Aspects 1 to 13, wherein the at least one processor is configured to: provide the first machine learning network with respective luminance information, respective first chrominance information, and respective second chrominance information, corresponding to a key frame image; and provide the second machine learning network with luminance information corresponding to a dependent frame image.

Aspect 15. The apparatus of Aspect 14, wherein, to generate the enhanced dependent frame image, the at least one processor is configured to: downscale the luminance information corresponding to the dependent frame image, wherein the downscaled luminance information has a resolution that is the same as a resolution of the hidden state output associated with the enhanced key frame image.

Aspect 16. The apparatus of Aspect 15, wherein the at least one processor is further configured to: generate, using a convolution layer of the second machine learning network, a correlation output tensor indicative of correlation information between the downscaled luminance information and the hidden state output associated with the enhanced key frame image; determine, using a cross attention layer of the second machine learning network, an attention map based on the correlation output tensor; and determine a feature alignment between features of the downscaled luminance information and the hidden state output, the feature alignment based on the attention map.

Aspect 17. The apparatus of Aspect 16, wherein the at least one processor is further configured to: generate, using the second machine learning network, an updated hidden state output associated with the enhanced dependent frame image, based on warping the feature alignment with the hidden state output associated with the enhanced keyframe image.

Aspect 18. The apparatus of any of Aspects 1 to 17, wherein the at least one processor is configured to: classify the first image as a key frame based on a first motion information between the first image and the previous image; and classify the second image as a dependent frame based on a second motion information between the second image and the first image.

Aspect 19. The apparatus of Aspect 18, wherein: the first motion information comprises a first perceptual similarity index value determined using a frame identification neural network, wherein the first motion information is indicative of the difference between the first image and the previous image based on the first perceptual similarity index value being less than a threshold; and the second motion information comprises a second perceptual similarity index value determined using the frame identification neural network, wherein the second motion information is indicative of the similarity between the second image and the first image based on the second perceptual similarity index value being greater than the threshold.

Aspect 20. The apparatus of any of Aspects 1 to 19, wherein the at least one processor is further configured to: classify each respective image of the plurality of images as a low-light image or a non-low-light image based on a lux index associated with each respective image; and classify, using a frame identification neural network, each low-light image of the plurality of images as a key frame or a dependent frame.

Aspect 21. A method for processing image data, the method comprising: classify a first image as a key frame, based on a difference between the first image and a previous image, wherein the first image and the previous image are included in a plurality of images; generating, using a first machine learning network, an enhanced key frame image corresponding to the first image and a hidden state output associated with the enhanced key frame image; classifying a second image of the plurality of images as a dependent frame, based on a similarity between the second image and the first image; and generating, using a second machine learning network, an enhanced dependent frame image corresponding to the second image, wherein the enhanced dependent frame image is based on the second image and the hidden state output associated with the enhanced key frame image.

Aspect 22. The method of Aspect 21, further comprising: generating, using the second machine learning network, an updated hidden state output associated with the enhanced dependent frame image.

Aspect 23. The method of Aspect 22, wherein generating the updated hidden state output comprises: warping chrominance information of the second image with the hidden state output associated with the enhanced key frame image.

Aspect 24. The method of any of Aspects 22 to 23, further comprising: classifying a third image of the plurality of images as a dependent frame, based on a similarity between the third image and the second image; and generate, using the second machine learning network, an enhanced dependent frame image corresponding to the third image, wherein the enhanced dependent frame image corresponding to the third image is based on the third image and the updated hidden state output.

Aspect 25. The method of any of Aspects 21 to 24, wherein the first image and the second image are low-light images, and wherein a respective luminance associated with the first image and the second image is less than a low-light threshold.

Aspect 26. The method of any of Aspects 21 to 25, further comprising: classifying, using a low-light detection engine, each respective image of the plurality of images as a low-light image or a non-low-light image; and classifying, using a frame identification neural network, each low-light image of the plurality of images as a key frame or a dependent frame.

Aspect 27. The method of Aspect 26, wherein classifying each respective image using the low-light detection engine comprises: generating a first luminance histogram for the respective image and a second luminance histogram for a previous image, wherein the previous image and the respective image are consecutive images in the plurality of images; and determining a binary classification for the respective image, the binary classification based on the first luminance histogram and the second luminance histogram.

Aspect 28. The method of any of Aspects 21 to 27, wherein the first machine learning network is different from the second machine learning network.

Aspect 29. The method of any of Aspects 21 to 28, wherein the first machine learning network is a deep neural network (DNN), and wherein the first machine learning network includes: a luminance enhancement sub-network; and a chrominance enhancement sub-network; and Aspect 30. The method of Aspect 29, wherein the hidden state output associated with the enhanced key frame image includes: enhanced luminance features associated with the enhanced key frame image, the enhanced luminance features generated using the luminance enhancement sub-network; and enhanced chrominance features associated with the enhanced key frame image, the enhanced chrominance features generated using the chrominance enhancement sub-network.

Aspect 31. The method of any of Aspects 29 to 30, wherein generating the hidden state output associated with the enhanced key frame image comprises: generating, using the chrominance enhancement sub-network, enhanced chrominance features associated with chrominance information of the first image; and fusing the enhanced chrominance features with an internal hidden state of the luminance enhancement sub-network, wherein the internal hidden state is different from the hidden state output.

Aspect 32. The method of any of Aspects 21 to 31, wherein: the second machine learning network is a recurrent neural network (RNN); and a luminance information provided as input to the second machine learning network has a resolution less than or equal to one half of a resolution of luminance information provided as input to the first machine learning network.

Aspect 33. The method of Aspect 32, wherein: a resolution of the first image is the same as a resolution of the second image; and each image of the plurality of images has the resolution.

Aspect 34. The method of any of Aspects 21 to 33, further comprising: providing the first machine learning network with respective luminance information, respective first chrominance information, and respective second chrominance information, corresponding to a key frame image; and providing the second machine learning network with luminance information corresponding to a dependent frame image.

Aspect 35. The method of Aspect 34, wherein generating the enhanced dependent frame image comprises: downscaling the luminance information corresponding to the dependent frame image, wherein the downscaled luminance information has a resolution that is the same as a resolution of the hidden state output associated with the enhanced key frame image.

Aspect 36. The method of Aspect 35, further comprising: generating, using a convolution layer of the second machine learning network, a correlation output tensor indicative of correlation information between the downscaled luminance information and the hidden state output associated with the enhanced key frame image; determining, using a cross attention layer of the second machine learning network, an attention map based on the correlation output tensor; and determining a feature alignment between features of the downscaled luminance information and the hidden state output, the feature alignment based on the attention map.

Aspect 37. The method of Aspect 36, further comprising: generating, using the second machine learning network, an updated hidden state output associated with the enhanced dependent frame image, based on warping the feature alignment with the hidden state output associated with the enhanced keyframe image.

Aspect 38. The method of any of Aspects 21 to 37, further comprising: classifying the first image as a key frame based on a first motion information between the first image and the previous image; and classifying the second image as a dependent frame based on a second motion information between the second image and the first image.

Aspect 39. The method of Aspect 38, wherein: the first motion information comprises a first perceptual similarity index value determined using a frame identification neural network, wherein the first motion information is indicative of the difference between the first image and the previous image based on the first perceptual similarity index value being less than a threshold; and the second motion information comprises a second perceptual similarity index value determined using the frame identification neural network, wherein the second motion information is indicative of the similarity between the second image and the first image based on the second perceptual similarity index value being greater than the threshold.

Aspect 40. The method of any of Aspects 21 to 39, further comprising: classifying each respective image of the plurality of images as a low-light image or a non-low-light image based on a lux index associated with each respective image; and classifying, using a frame identification neural network, each low-light image of the plurality of images as a key frame or a dependent frame.

Aspect 41: A computer-readable medium storing instructions that, when executed by one or more processors, cause the one or more processors to perform operations according to any of Aspects 1 to 20.

Aspect 42: A computer-readable medium storing instructions that, when executed by one or more processors, cause the one or more processors to perform operations according to any of Aspects 21 to 40.

Aspect 43: An apparatus for processing image data, comprising one or more means for performing operations according to any of Aspects 1 to 20.

Aspect 44: An apparatus for processing image data, comprising one or more means for performing operations according to any of Aspects 21 to 40.

What is claimed is:

1. An apparatus for processing image data, the apparatus comprising:
   at least one memory; and
   at least one processor coupled to the at least one memory, the at least one processor being configured to:
   classify a first image as a key frame, based on a difference between the first image and a previous image, wherein the first image and the previous image are included in a plurality of images;
   generate, using a first machine learning network, an enhanced key frame image corresponding to the first image and a hidden state output associated with the enhanced key frame image;
   classify a second image of the plurality of images as a dependent frame, based on a similarity between the second image and the first image;
   generate, using a second machine learning network, an enhanced dependent frame image corresponding to the second image, wherein the enhanced dependent frame image is based on the second image and the hidden state output associated with the enhanced key frame image;
   classify, using a low-light detection engine, each respective image of the plurality of images as a low-light image or a non-low-light image; and
   classify, using a frame identification neural network, each low-light image of the plurality of images as a key frame or a dependent frame.

2. The apparatus of claim 1, wherein the at least one processor is further configured to:
   generate, using the second machine learning network, an updated hidden state output associated with the enhanced dependent frame image.

3. The apparatus of claim 2, wherein, to generate the updated hidden state output, the at least one processor is configured to:
   warp chrominance information of the second image with the hidden state output associated with the enhanced key frame image.

4. The apparatus of claim 2, wherein the at least one processor is further configured to:
   classify a third image of the plurality of images as a dependent frame, based on a similarity between the third image and the second image; and
   generate, using the second machine learning network, an enhanced dependent frame image corresponding to the third image, wherein the enhanced dependent frame image corresponding to the third image is based on the third image and the updated hidden state output.

5. The apparatus of claim 1, wherein the first image and the second image are low-light images, and wherein a respective luminance associated with the first image and the second image is less than a low-light threshold.

6. The apparatus of claim 1, wherein, to classify each respective image using the low-light detection engine, the at least one processor is configured to:
generate a first luminance histogram for the respective image and a second luminance histogram for a previous image, wherein the previous image and the respective image are consecutive images in the plurality of images; and
determine a binary classification for the respective image, the binary classification based on the first luminance histogram and the second luminance histogram.

7. The apparatus of claim 1, wherein the first machine learning network is different from the second machine learning network.

8. An apparatus for processing image data, the apparatus comprising:
at least one memory; and
at least one processor coupled to the at least one memory, the at least one processor being configured to:
classify a first image as a key frame, based on a difference between the first image and a previous image, wherein the first image and the previous image are included in a plurality of images;
generate, using a first machine learning network, an enhanced key frame image corresponding to the first image and a hidden state output associated with the enhanced key frame image;
classify a second image of the plurality of images as a dependent frame, based on a similarity between the second image and the first image; and
generate, using a second machine learning network, an enhanced dependent frame image corresponding to the second image, wherein the enhanced dependent frame image is based on the second image and the hidden state output associated with the enhanced key frame image;
wherein the first machine learning network is a deep neural network (DNN), and
wherein the first machine learning network includes:
a luminance enhancement sub-network; and
a chrominance enhancement sub-network.

9. The apparatus of claim 8, wherein the hidden state output associated with the enhanced key frame image includes:
enhanced luminance features associated with the enhanced key frame image, the enhanced luminance features generated using the luminance enhancement sub-network; and
enhanced chrominance features associated with the enhanced key frame image, the enhanced chrominance features generated using the chrominance enhancement sub-network.

10. The apparatus of claim 8, wherein, to generate the hidden state output associated with the enhanced key frame image, the at least one processor is configured to:
generate, using the chrominance enhancement sub-network, enhanced chrominance features associated with chrominance information of the first image; and
fuse the enhanced chrominance features with an internal hidden state of the luminance enhancement sub-network, wherein the internal hidden state is different from the hidden state output.

11. An apparatus for processing image data, the apparatus comprising:
at least one memory; and
at least one processor coupled to the at least one memory, the at least one processor being configured to:
classify a first image as a key frame, based on a difference between the first image and a previous image, wherein the first image and the previous image are included in a plurality of images;
generate, using a first machine learning network, an enhanced key frame image corresponding to the first image and a hidden state output associated with the enhanced key frame image;
classify a second image of the plurality of images as a dependent frame, based on a similarity between the second image and the first image; and
generate, using a second machine learning network, an enhanced dependent frame image corresponding to the second image, wherein the enhanced dependent frame image is based on the second image and the hidden state output associated with the enhanced key frame image;
wherein:
the second machine learning network is a recurrent neural network (RNN); and
a luminance information provided as input to the second machine learning network has a resolution less than or equal to one half of a resolution of luminance information provided as input to the first machine learning network;
a resolution of the first image is the same as a resolution of the second image; and
each image of the plurality of images has the resolution.

12. An apparatus for processing image data, the apparatus comprising:
at least one memory; and
at least one processor coupled to the at least one memory, the at least one processor being configured to:
classify a first image as a key frame, based on a difference between the first image and a previous image, wherein the first image and the previous image are included in a plurality of images;
generate, using a first machine learning network, an enhanced key frame image corresponding to the first image and a hidden state output associated with the enhanced key frame image;
classify a second image of the plurality of images as a dependent frame, based on a similarity between the second image and the first image; and
generate, using a second machine learning network, an enhanced dependent frame image corresponding to the second image, wherein the enhanced dependent frame image is based on the second image and the hidden state output associated with the enhanced key frame image;
provide the first machine learning network with respective luminance information, respective first chrominance information, and respective second chrominance information, corresponding to a key frame image; and
provide the second machine learning network with luminance information corresponding to a dependent frame image;

wherein, to generate the enhanced dependent frame image, the at least one processor is configured to:
downscale the luminance information corresponding to the dependent frame image, wherein the downscaled luminance information has a resolution that is the same as a resolution of the hidden state output associated with the enhanced key frame image.

13. The apparatus of claim 12, wherein the at least one processor is further configured to:
generate, using a convolution layer of the second machine learning network, a correlation output tensor indicative of correlation information between the downscaled luminance information and the hidden state output associated with the enhanced key frame image;
determine, using a cross attention layer of the second machine learning network, an attention map based on the correlation output tensor; and
determine a feature alignment between features of the downscaled luminance information and the hidden state output, the feature alignment based on the attention map.

14. The apparatus of claim 13, wherein the at least one processor is further configured to:
generate, using the second machine learning network, an updated hidden state output associated with the enhanced dependent frame image, based on warping the feature alignment with the hidden state output associated with the enhanced keyframe image.

15. The apparatus of claim 1, wherein the at least one processor is configured to:
classify the first image as a key frame based on a first motion information between the first image and the previous image; and
classify the second image as a dependent frame based on a second motion information between the second image and the first image.

16. The apparatus of claim 15, wherein:
the first motion information comprises a first perceptual similarity index value determined using a frame identification neural network, wherein the first motion information is indicative of the difference between the first image and the previous image based on the first perceptual similarity index value being less than a threshold; and
the second motion information comprises a second perceptual similarity index value determined using the frame identification neural network, wherein the second motion information is indicative of the similarity between the second image and the first image based on the second perceptual similarity index value being greater than the threshold.

17. An apparatus for processing image data, the apparatus comprising:
at least one memory; and
at least one processor coupled to the at least one memory, the at least one processor being configured to:
classify a first image as a key frame, based on a difference between the first image and a previous image, wherein the first image and the previous image are included in a plurality of images;
generate, using a first machine learning network, an enhanced key frame image corresponding to the first image and a hidden state output associated with the enhanced key frame image;
classify a second image of the plurality of images as a dependent frame, based on a similarity between the second image and the first image;
generate, using a second machine learning network, an enhanced dependent frame image corresponding to the second image, wherein the enhanced dependent frame image is based on the second image and the hidden state output associated with the enhanced key frame image;
classify each respective image of the plurality of images as a low-light image or a non-low-light image based on a lux index associated with each respective image; and
classify, using a frame identification neural network, each low-light image of the plurality of images as a key frame or a dependent frame.

18. A method for processing image data, the method comprising:
classifying a first image as a key frame, based on a difference between the first image and a previous image, wherein the first image and the previous image are included in a plurality of images;
generating, using a first machine learning network, an enhanced key frame image corresponding to the first image and a hidden state output associated with the enhanced key frame image;
classifying a second image of the plurality of images as a dependent frame, based on a similarity between the second image and the first image;
generating, using a second machine learning network, an enhanced dependent frame image corresponding to the second image, wherein the enhanced dependent frame image is based on the second image and the hidden state output associated with the enhanced key frame image;
classifying, using a low-light detection engine, each respective image of the plurality of images as a low-light image or a non-low-light image; and
classifying, using a frame identification neural network, each low-light image of the plurality of images as a key frame or a dependent frame.

19. The method of claim 18, further comprising:
generating, using the second machine learning network, an updated hidden state output associated with the enhanced dependent frame image.

20. The method of claim 19, wherein generating the updated hidden state output comprises:
warping chrominance information of the second image with the hidden state output associated with the enhanced key frame image.

21. The method of claim 19, further comprising:
classifying a third image of the plurality of images as a dependent frame, based on a similarity between the third image and the second image; and
generate, using the second machine learning network, an enhanced dependent frame image corresponding to the third image, wherein the enhanced dependent frame image corresponding to the third image is based on the third image and the updated hidden state output.

22. The method of claim 18, wherein the first image and the second image are low-light images, and wherein a respective luminance associated with the first image and the second image is less than a low-light threshold.

23. The method of claim 18, wherein classifying each respective image using the low-light detection engine comprises:
generating a first luminance histogram for the respective image and a second luminance histogram for a previous image, wherein the previous image and the respective image are consecutive images in the plurality of images; and determining a binary classification for the respective image, the binary classification based on the first luminance histogram and the second luminance histogram.

24. The method of claim 18, wherein the first machine learning network is a deep neural network (DNN), and wherein the first machine learning network includes:
 a luminance enhancement sub-network; and
 a chrominance enhancement sub-network.

25. The method of claim 24, wherein the hidden state output associated with the enhanced key frame image includes:
 enhanced luminance features associated with the enhanced key frame image, the enhanced luminance features generated using the luminance enhancement sub-network; and
 enhanced chrominance features associated with the enhanced key frame image, the enhanced chrominance features generated using the chrominance enhancement sub-network.

26. The method of claim 25, wherein generating the hidden state output associated with the enhanced key frame image comprises:
 generating, using the chrominance enhancement sub-network, enhanced chrominance features associated with chrominance information of the first image; and
 fusing the enhanced chrominance features with an internal hidden state of the luminance enhancement sub-network, wherein the internal hidden state is different from the hidden state output.

* * * * *